US011831442B2

(12) United States Patent
Sarkis et al.

(10) Patent No.: US 11,831,442 B2
(45) Date of Patent: Nov. 28, 2023

(54) DEMODULATION REFERENCE SIGNAL (DMRS) OVERHEAD IN SIDELINK WIRELESS COMMUNICATIONS

(71) Applicant: QUALCOMM Incorporated, San Diego, CA (US)

(72) Inventors: Gabi Sarkis, San Diego, CA (US); Shuanshuan Wu, San Diego, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 259 days.

(21) Appl. No.: 17/319,964

(22) Filed: May 13, 2021

(65) Prior Publication Data

US 2021/0367715 A1     Nov. 25, 2021

Related U.S. Application Data

(60) Provisional application No. 63/025,922, filed on May 15, 2020.

(51) Int. Cl.
*H04W 72/20*     (2023.01)
*H04L 5/00*     (2006.01)
(Continued)

(52) U.S. Cl.
CPC ......... *H04L 1/1819* (2013.01); *H04L 1/1896* (2013.01); *H04L 5/0051* (2013.01); *H04W 72/20* (2023.01); *H04W 92/18* (2013.01)

(58) Field of Classification Search
CPC ... H04L 1/1819; H04L 1/1896; H04L 5/0051; H04W 72/20; H04W 92/18
See application file for complete search history.

(56) References Cited

U.S. PATENT DOCUMENTS

2021/0211219 A1*   7/2021   Sarkis .................. H04L 1/0041
2021/0258827 A1*   8/2021   Sarkis .................. H04L 1/0007
(Continued)

FOREIGN PATENT DOCUMENTS

KR        20200056586 A        5/2020

OTHER PUBLICATIONS

Asustek: "Remaining Issues for NR V2X Structure", 3GPP Draft, 3GPP TSG RAN WG1 #101, R1-2003700, vol. RAN WG1, No. e-Meeting; May 25, 2020-Jun. 5, 2020, May 13, 2020 (May 13, 2020), XP051883040, 3 pages, Retrieved from the Internet: URL: https://ftp.3gpp.org/tsg_ran/WG1_RL1/TSGR1_101-e/Docs/R1-2003700.zip [retrieved on May 13, 2020], Sections 1-3.

(Continued)

*Primary Examiner* — Kent Krueger
(74) *Attorney, Agent, or Firm* — Loza & Loza LLP

(57) ABSTRACT

Transmit and receive wireless communication devices configured to independently determine the same transport block size (TBS) for use with sidelink communications. In an illustrative example, a transmitting device includes a transceiver; a memory; and a processor, with the processor configured to generate or obtain a Physical Sidelink Feedback Channel (PSFCH) overhead indicator indicating whether PSFCH overhead is used in determining the TBS. The processor also determines a number of demodulation reference signal (DMRS) resource elements (REs) associated with DMRS overhead for use in the TBS determination. The processor determines the TBS based on the number of DMRS REs and on the PSFCH overhead indicator, and then transmits signals to a receiving device using sidelink wireless communication that include a PSFCH overhead indicator. The signals are transmitted according to the determined TBS. The PSFCH overhead indicator indicates whether (Continued)

PSFCH overhead is to be used by the receiving device for TBS determination.

30 Claims, 25 Drawing Sheets

(51) Int. Cl.
  *H04L 1/1812* (2023.01)
  *H04L 1/1867* (2023.01)
  *H04W 92/18* (2009.01)

(56) References Cited

U.S. PATENT DOCUMENTS

| | | | |
|---|---|---|---|
| 2021/0321403 A1* | 10/2021 | Ye | H04L 5/005 |
| 2021/0329604 A1* | 10/2021 | Chen | H04W 72/04 |
| 2022/0210804 A1* | 6/2022 | Hwang | H04W 72/20 |
| 2022/0225353 A1* | 7/2022 | Peng | H04L 5/0053 |
| 2022/0232527 A1* | 7/2022 | Hong | H04W 72/02 |
| 2022/0232575 A1* | 7/2022 | Lee | H04W 52/367 |

OTHER PUBLICATIONS

International Search Report and Written Opinion—PCT/US2021/032452—ISA/EPO—dated Sep. 7, 2021.

Qualcomm Incorporated: "Considerations on Physical Layer Aspects of NR V2X," 3GPP Draft, 3GPP TSG RAN WG1 Meeting #100bis-e, R1-2002537, vol. RAN WG1, No. Online Meeting, Apr. 20, 2020-Apr. 30, 2020, Apr. 11, 2020 (Apr. 11, 2020), XP051875651, 18 pages, Retrieved from the Internet: URL: https://ftp.3gpp.org/tsg_ran/WG1_RL1/TSGR1_100b_e/Docs/R1-2002537.zip [retrieved on Apr. 11, 2020] Sections 1-6.

Qualcomm Incorporated: "Considerations on Physical Layer Aspects of NR V2X", 3GPP Draft, 3GPP TSG RAN WG1 Meeting #100-e, R1-2001213, R1-2000962, vol. RAN WG1, No. Feb. 24, 2020-Mar. 6, 2020, Mar. 10, 2020 (Mar. 10, 2020), XP051863809, 23 pages, Retrieved from the Internet : URL: https://ftp.3gpp.org/tsg_ran/WG1_RL1/TSGR1_100_e/Docs/R1-2001213.zip [retrieved on Mar. 10, 2020] Sections 1-6.

3GPP Ts 38.214: "3rd Generation Partnership Project; Technical Specification Group Radio Access Network; NR; Physical Layer Procedures for Data (Release 16)", 3GPP Draft, 38214- G10, 3GPP Ts 38.214, 3rd Generation Partnership Project (3GPP), Mobile Competence Centre, 650, Route Des Lucioles, F-06921 Sophia-Antipolis Cedex, France, vol. Ran WG1. No. V16.1.0, Apr. 3, 2020 (2020-04-03), pp. 1-151, XP051893823, Retrieved from the Internet: Url: Url: https://ftp.3gpp.org/Specs/archive/38_series/38.214/38214-g10.zip 38214-g10.docx Draft38214-g10.docx [retrieved on 2020-04-03], pp. 44-47, col. 5.1.6.5, Section 5.2. section 5.1.5, sections 5.2 to 5.2.1.6, section 5.2.2.4, section 5.2.5, clauses 5.1.5, 5.2.1, 5.2.2.3.1, 6-6.1.2.2.3, 6.2.1-6.3.2.

\* cited by examiner

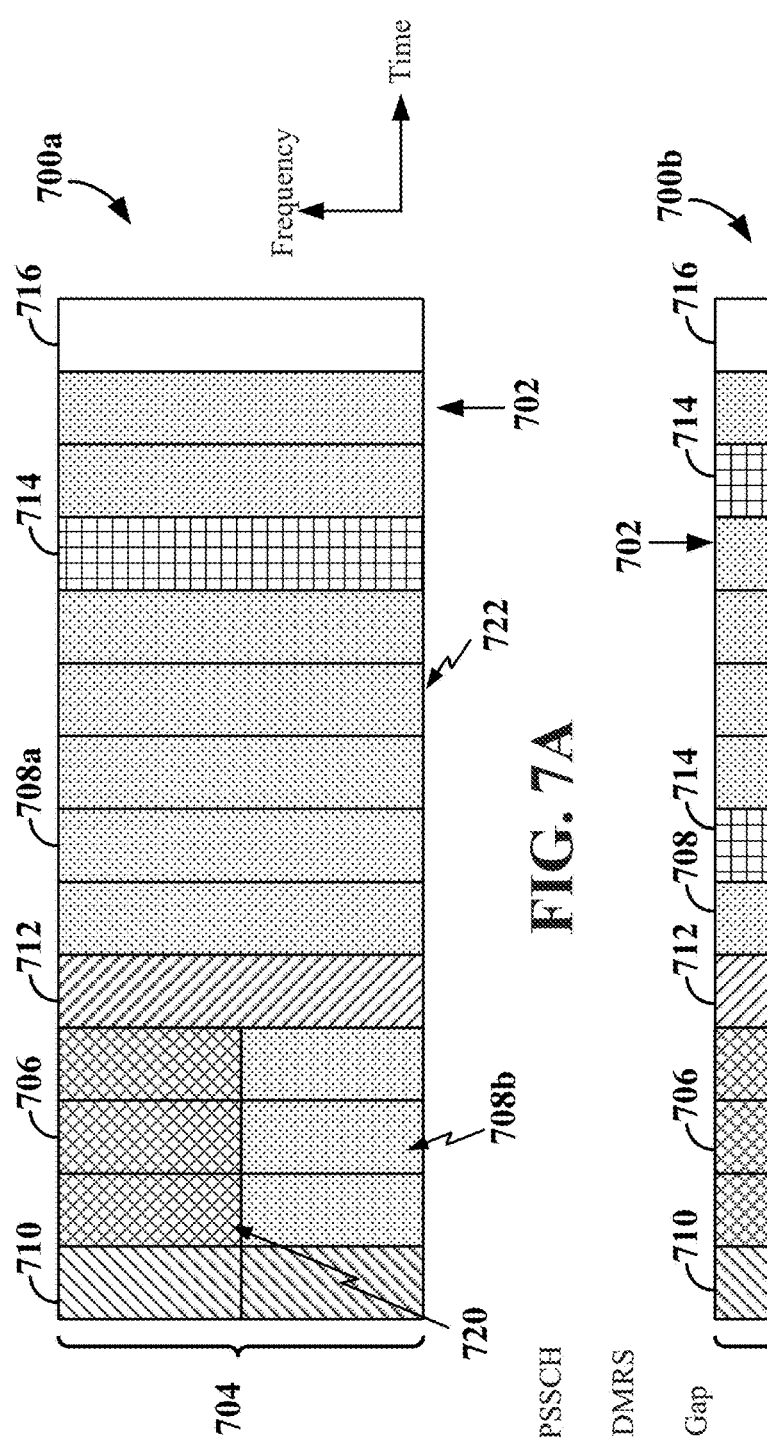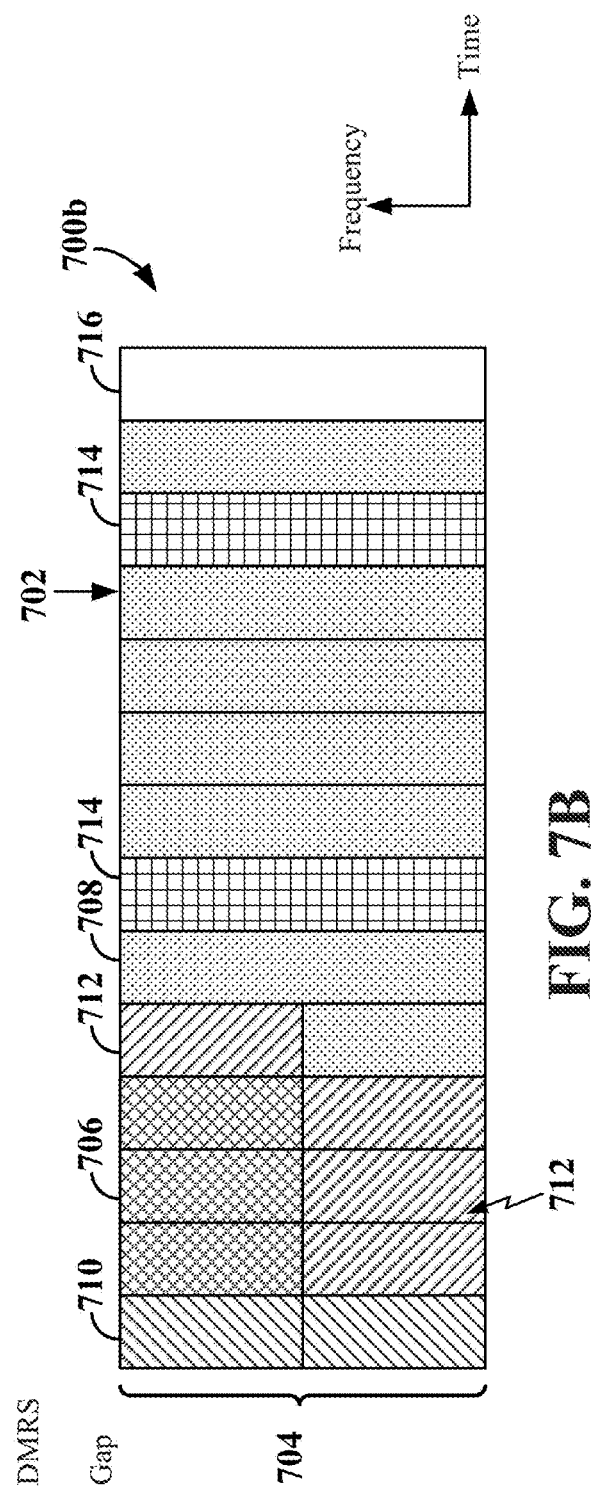
FIG. 7A
FIG. 7B

DEMODULATION REFERENCE SIGNAL (DMRS) OVERHEAD IN SIDELINK WIRELESS COMMUNICATIONS

CROSS-REFERENCE TO RELATED APPLICATIONS

This application claims priority based on U.S. Provisional Patent Application Ser. No. 63/025,922, filed May 15, 2020, for "DETERMINING AVERAGE DEMODULATION REFERENCE SIGNAL (DMRS) OVERHEAD IN WIRELESS COMMUNICATIONS," which is assigned to the assignee hereof and incorporated by reference herein in its entirety.

FIELD OF THE DISCLOSURE

The technology discussed herein relates generally to wireless communication networks, and more particularly, to determining a transport block size (TBS) for sidelink wireless communications involving demodulation reference signals (DMRS).

DESCRIPTION OF RELATED ART

Wireless communication between devices may be facilitated by various network configurations. In one configuration, a cellular network may enable wireless communication devices (e.g., user equipment (UEs)) to communicate with one another through signaling with a nearby base station or cell. Another wireless communication network configuration is a device to device (D2D) network, in which wireless communication devices may signal one another directly, rather than via an intermediary base station or cell. For example, D2D communication networks may utilize sidelink signaling to facilitate the direct communication between wireless communication devices.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one example, a wireless communication device is provided for use in a sidelink wireless communication network. The wireless communication device, which may be a transmitting wireless communication device, includes: a wireless transceiver; a memory; and a processor communicatively coupled to the wireless transceiver and the memory. The processor is configured to: obtain a Physical Sidelink Feedback Channel (PSFCH) overhead indicator indicating whether PSFCH overhead is used in determining a transport block size (TBS); determine a number of demodulation reference signal (DMRS) resource elements (REs) associated with DMRS overhead for use in determining the TBS; determine the TBS based in part on the number of DMRS REs and the PSFCH overhead indicator; and control the wireless transceiver to transmit signals that include the PSFCH overhead indicator to a receiving wireless communication device using sidelink wireless communication, wherein the signals are transmitted according to the determined TBS.

In another example, a method of sidelink wireless communication at a wireless communication device is provided. The method includes: obtaining a PSFCH overhead indicator indicating whether PSFCH overhead is used in determining a TBS; determining a number of DMRS REs associated with DMRS overhead for use in determining the TBS; determining the TBS based in part on the number of DMRS REs and the PSFCH overhead indicator; and controlling a wireless transceiver to transmit signals that include a PSFCH overhead indicator to a receiving wireless communication device using sidelink wireless communication, wherein the signals are transmitted according to the determined TBS.

In yet another example, a wireless communication device is provided for use in a sidelink wireless communication network. The wireless communication device, which may be a receiving wireless communication device, includes: a wireless transceiver; a memory; and a processor communicatively coupled to the wireless transceiver and the memory. The processor is configured to: receive a PSFCH overhead indicator from a transmitting wireless communication device using the wireless transceiver on a wireless sidelink channel; determine a number of DMRS REs associated with DMRS overhead for use in sidelink wireless communication; determine a TBS based in part on the number of DMRS REs and the PSFCH overhead indicator; receive data channel transmissions from the transmitting wireless communication device; and decode the data channel transmissions using the TBS.

In still another example, a method of sidelink wireless communication at a wireless communication device is provided. The method includes: receiving a PSFCH overhead indicator from a transmitting wireless communication device on a wireless sidelink channel; determining a number of DMRS REs associated with DMRS overhead for use in sidelink wireless communication; determining a TBS based in part on the number of DMRS REs and the PSFCH overhead indicator; receiving data channel transmissions from the transmitting wireless communication device; and decoding the data channel transmissions using the TBS.

BRIEF DESCRIPTION OF THE DRAWINGS

FIGS. 7A-7C illustrate examples of sidelink slot structures, wherein demodulation reference signals (DMRS) are communicated.

DETAILED DESCRIPTION

Figure 1:
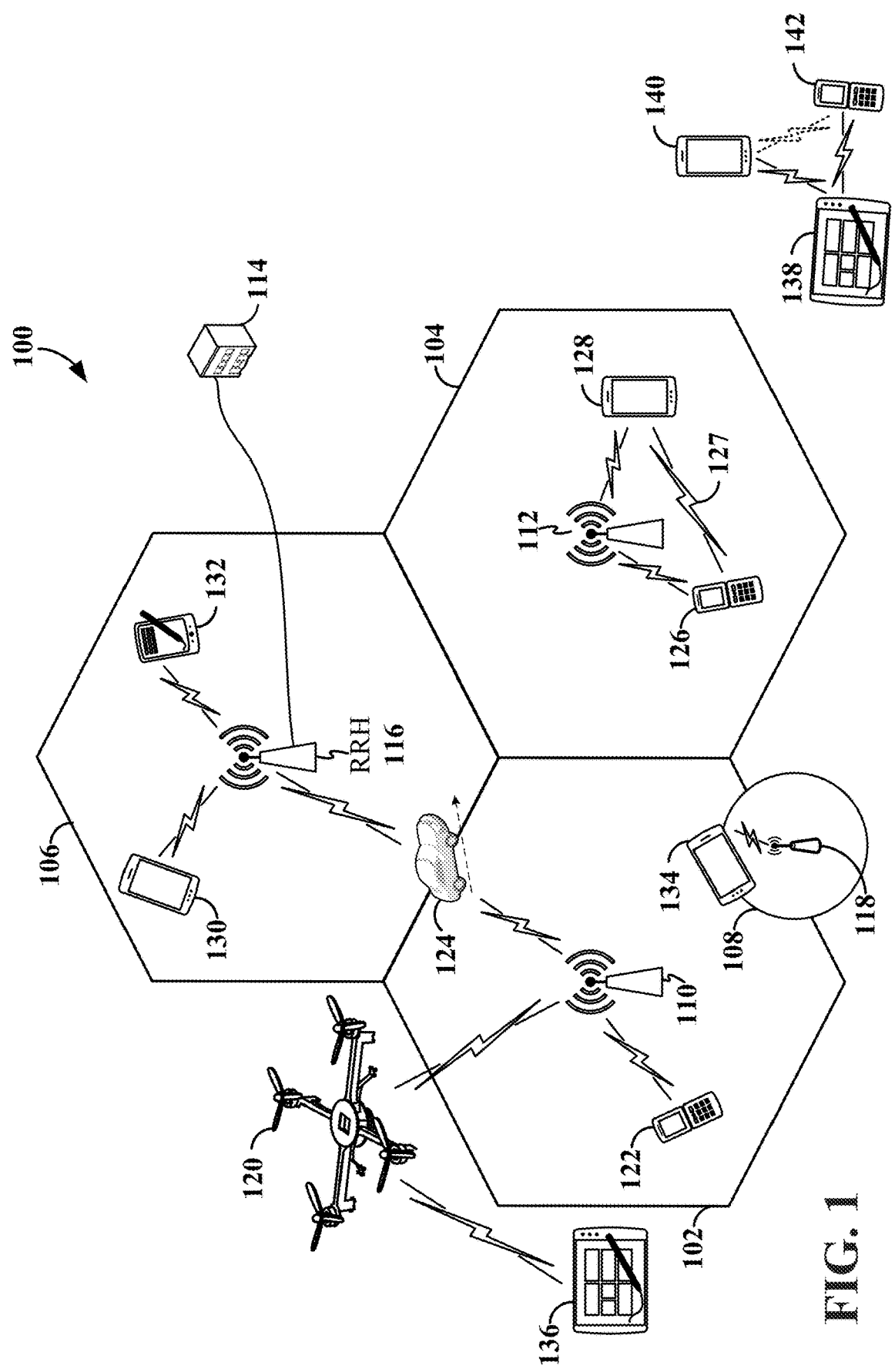
FIG. 1 is a diagram illustrating an example of a wireless radio access network according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

It should be understood that the above examples are not necessarily intended to limit claimed subject matter. For example, unless specifically recited, claimed subject matter relating to wireless communications is not necessarily intended to be limited to any particular author/entity defined frequency band, or the like.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Issues can arise in sidelink communications pertaining to determining an average number of demodulation reference signal (DMRS) resource elements (REs) associated with DMRS overhead to use in determining a transport block size (TBS). Various aspects of the disclosure relate to mechanisms for a wireless communication device to configure and determine the average number of DMRS REs associated with DMRS overhead to use in determining TBS for both transmissions and re-transmissions depending, in some examples, upon whether Physical Sidelink Feedback Channel (PSFCH) resources overhead are to be used for TBS determination in the transmissions and re-transmissions.

Briefly, in 5G New Radio (NR) sidelink communications, some slots may have PSFCH resources, whereas others do not. A user equipment (UE) may randomly select from available resources for transmission in slots with or without PSFCH resources. Slots with PSFCH resource may occur with a configurable period (0, 1, 2, 4) slots. Multiple time-domain DMRS patterns may be supported in NR sidelink. 2-symbol DMRS, 3-symbol DMRS, and 4-symbol DMRS may be supported. A transmitter UE may indicate in sidelink control information (SCI), which pattern is used in a transmission. A set of enabled DMRS patterns may be pre-configured per resource pool. In TBS determination, overhead due to different factors may be removed from the number of available REs that can be used to transmit data. One feature of TBS determination presented herein is that TBS remains the same between initial transmission and retransmissions.

In some examples disclosed herein, a PSFCH overhead indicator is sent from a first wireless communication device to a second wireless communication device indicating whether PSFCH resources are used for TBS determination during transmissions and re-transmissions. The first wireless communication device and the second wireless communication device may be configured to independently determine the same average number of DMRS REs associated with DMRS overhead to use in determining the TBS. In some examples, a first (smaller) average number of DMRS REs is used for TBS determination when PSFCH resources overhead are enabled in TBS determination and a second (larger) average number of DMRS REs is used for TBS determination when PSFCH resources overhead are not enabled. In some examples, the average number of DMRS REs associated with DMRS overhead to use in determining TBS is obtained from corresponding lookup tables maintained in both the first and second wireless communication devices. In other examples, the average number of DMRS REs associated with DMRS overhead is independently computed by both the first and second wireless communication devices using the same computational rules and parameters.

Thus, in these and other examples disclosed herein, both the first and second wireless communication devices independently determine the same average number of DMRS REs associated with DMRS overhead to use for both transmission and retransmissions. The particular determination is made based in part on the indicator sent by the first wireless communication device to the second wireless communication devices, where the indicator may be a single bit value within SCI.

In some examples, the sidelink communications between the first and second wireless communication devices may be performed in accordance with device-to-device (D2D) communication protocols or procedures that allow UE to communicate with one another with or without the involvement of network infrastructures such as an access point or base stations. In some examples, the D2D sidelink communications may be performed further in accordance with Cellular V2X (CV2X) communication protocols or procedures, such as between a UE within a vehicle and a UE within another device, such as a traffic light or a mobile device held by a pedestrian.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. The RAN 100 may implement any suitable wireless communication technology or technologies to provide radio access. As one example, the RAN 100 may operate according to $3^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to a hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a UE based on an identification broadcasted over a geographical area from one access point or base station. FIG. 1 illustrates macrocells 102, 104, and 106, and a small cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB) or some other suitable terminology.

In FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quadcopter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112, 114, 118, and 120 may be configured to provide an access point to a core network (not shown) for all the UEs in the respective cells. In another example, a mobile network node (e.g., quadcopter 120) may be configured to function as a UE. For example, the quadcopter 120 may operate within cell 102 by communicating with base station 110.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe the scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or traffic information (e.g., user data traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of redundancy in the encoded information message can increase the reliability of the message, enabling correction for any bit errors that may occur due to the noise.

In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For the channels, puncturing, shortening, and repetition are used for rate matching.

However, those of ordinary skill in the art will understand that aspects of the present disclosure may be implemented utilizing any suitable channel code. Various implementations of base stations and UEs may include suitable hardware and capabilities (e.g., an encoder, a decoder, and/or a CODEC) to utilize one or more of the channel codes for wireless communication.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In the RAN 100, the ability for a UE to communicate while moving, independent of their location, is referred to as mobility. The various physical channels between the UE and the RAN are generally set up, maintained, and released under the control of an access and mobility management function (AMF), which may include a security context management function (SCMF) that manages the security context for both the control plane and the user plane functionality and a security anchor function (SEAF) that performs authentication. In various aspects of the disclosure, a RAN 100 may utilize DL-based mobility or UL-based mobility to enable mobility and handovers (e.g., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of the parameters, the UE may maintain communication with one or more of the neighboring cells. If the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating the condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and radio frame timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the RAN 100. Each of the cells may measure a strength of the pilot signal, and the RAN (e.g., one or more of the base stations 110 and 114/116 and/or a central node within the core network) may determine a serving cell for the UE 124. As the UE 124 moves through the RAN 100, the network may continue to monitor the uplink pilot signal transmitted by the UE 124. When the signal strength or quality of the pilot signal measured by a neighboring cell exceeds that of the signal strength or quality measured by the serving cell, the RAN 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and can increase the efficiency of both the UE and the network, since the number of mobility messages that need to be exchanged between the UE and the network may be reduced.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a transmitting sidelink device, and UEs 140 and 142 may function as a scheduled entity or a receiving sidelink device. For example, UE 138 may function as a scheduling entity in a device-to-device (D2D), peer-to-peer (P2P), vehicle-to-everything (V2X), and/or in a mesh network. In a mesh network example, UEs 140 and 142 may optionally communicate directly with one another in addition to communicating with the scheduling entity 138.

In some aspects of the present disclosure, two or more UEs (e.g., UEs 126 and 128) within the coverage area of a serving base station 112 may communicate with each other using sidelink signals 127 without relaying that communication through the base station. In this example, the base station 110 or one or both of the UEs 126 and 128 may function as scheduling entities to schedule sidelink communication between UEs 126 and 128. For example, UEs 126 and 128 may communicate sidelink signals 127 within a vehicle-to-everything (V2X) network.

In some examples, two primary technologies that may be used by V2X networks include dedicated short range communication (DSRC) based on IEEE 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink networks other than V2X networks.

Figure 2:
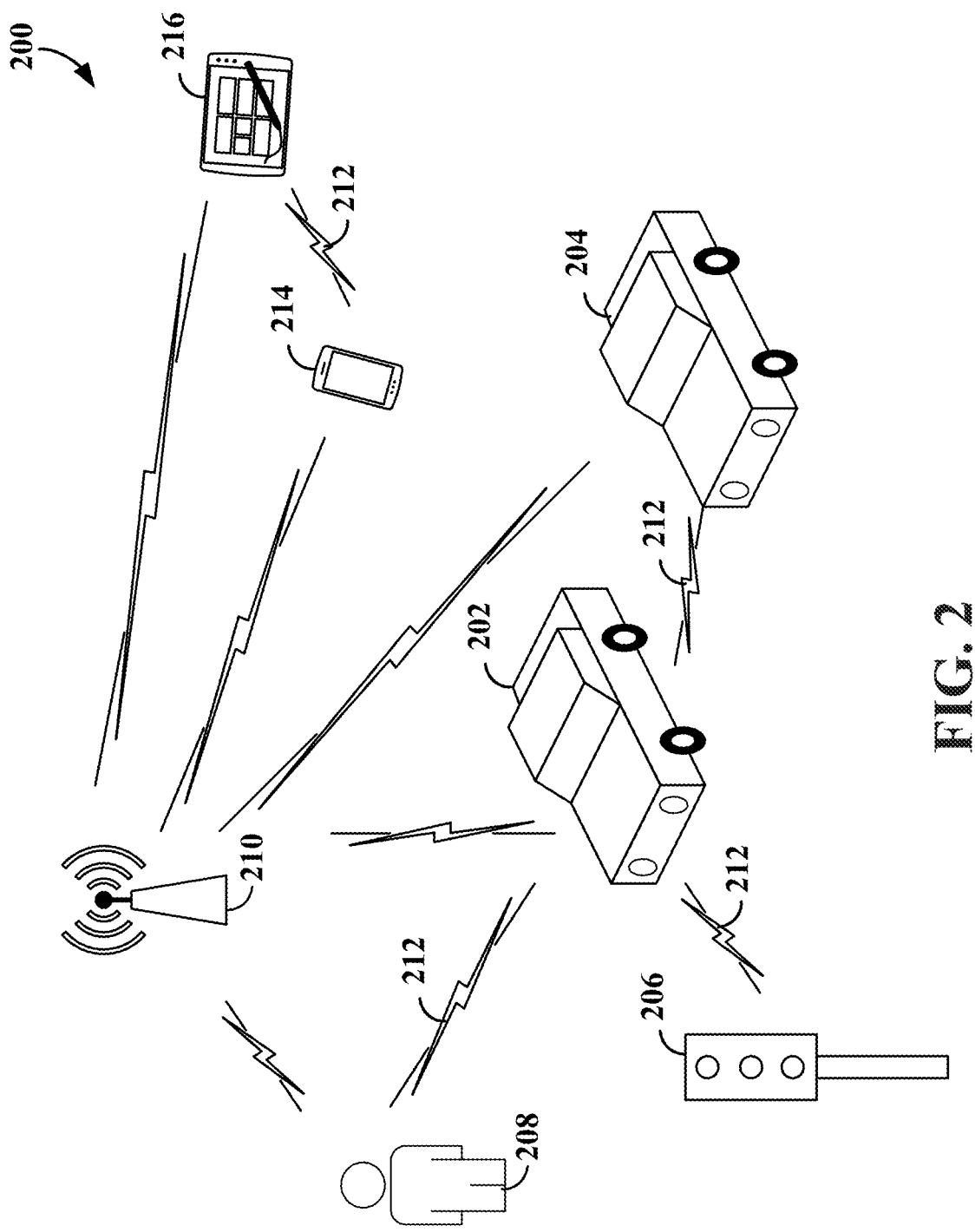
FIG. 2 is a diagram illustrating an example of a wireless communication network employing sidelink communication according to some aspects.

FIG. 2 illustrates an example of a wireless communication network 200 configured to support D2D or sidelink communication. In some examples, sidelink communication may include V2X communication. V2X communication involves the wireless exchange of information directly between not only vehicles (e.g., vehicles 202 and 204) themselves, but also directly between vehicles 202/204 and infrastructure 206, such as streetlights, buildings, traffic cameras, tollbooths or other stationary objects, vehicles 202/204 and pedestrians 208, and vehicles 202/204 and wireless communication networks (e.g., base station 210). In some examples, V2X communication may be implemented in accordance with the New Radio (NR) cellular V2X standard defined by 3GPP, Release 15, or other suitable standard.

V2X communication enable vehicles 202 and 204 to obtain information related to the weather, nearby accidents, road conditions, activities of nearby vehicles and pedestrians, objects nearby the vehicle, and other pertinent information that may be utilized to enhance the vehicle driving experience and increase vehicle safety. For example, such V2X data may enable autonomous driving and improve road safety and traffic efficiency. For example, the exchanged V2X data may be utilized by a V2X connected vehicle 202 and 204 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist 208 may be utilized to trigger a warning sound, vibration, flashing light, etc., in case of imminent danger.

The sidelink communication between vehicles 202 and 204 or between a vehicle 202 or 204 and either infrastructure 206 or a pedestrian 208 occurs over a proximity service (ProSe) PC5 interface 212. In various aspects of the disclosure, the PC5 interface 212 may further be utilized to support D2D communication in other proximity use cases. Examples of other proximity use cases may include public safety or commercial (e.g., entertainment, education, office, medical, and/or interactive) based proximity services. As used herein, the term proximity service (ProSe) communication refers to the direct (e.g., D2D) communication between UEs in proximity use cases other than V2X. In the example shown in FIG. 2, ProSe communication may occur between UEs 214 and 216.

ProSe communication may support different operational scenarios, such as in-coverage, out-of-coverage, and partial coverage. Out-of-coverage refers to a scenario in which UEs 214 and 216 are outside of the coverage area of a base station (e.g., base station 210), but each are still configured for ProSe communication. Partial coverage refers to a scenario in which one of the UEs (e.g., UE 216) is outside of the coverage area of a base station (e.g., base station 210), while the other UE (e.g., UE 214) is in communication with the base station 210. In-coverage refers to a scenario in which UEs 214 and 216 are in communication with the base station 210 (e.g., gNB) via a Uu (e.g., cellular interface) connection to receive ProSe service authorization and provisioning information to support ProSe operations.

Figure 3:
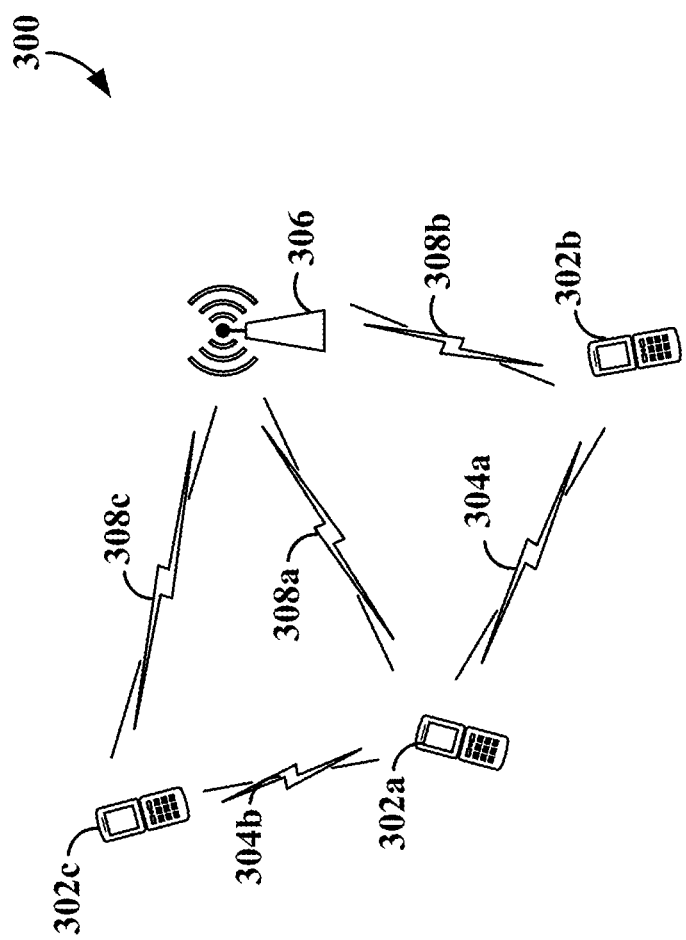
FIG. 3 is a diagram illustrating an example of a wireless communication system for facilitating both cellular and sidelink communication according to some aspects.

FIG. 3 is a diagram illustrating an example of a wireless communication system 300 for facilitating both cellular and sidelink communication. The wireless communication system 300 includes a plurality of wireless communication devices 302*a*, 302*b*, and 302*c* and a base station (e.g., eNB or gNB) 306. In some examples, the wireless communication devices 302*a*, 302*b*, and 302*c* may be UEs capable of implementing D2D or V2X devices within a V2X network.

The wireless communication devices 302*a* and 302*b* may communicate over a first PC5 interface 304*a*, while wireless communication devices 302*a* and 302*c* may communicate over a second PC5 interface 304*b*. Wireless communication devices 302*a*, 302*b*, and 302*c* may further communicate with the base station 306 over respective Uu interfaces 308*a*, 308*b*, and 308*b*. The sidelink communication over the PC5 interfaces 304*a* and 304*b* may be carried, for example, in a licensed frequency domain using radio resources operating according to a 5G NR or NR sidelink (SL) specification and/or in an unlicensed frequency domain, using radio resources operating according to 5G new radio-unlicensed (NR-U) specifications.

In some examples, a common carrier may be shared between the PC5 interfaces 304*a* and 304*b* and Uu interfaces 308*a*-308*c*, such that resources on the common carrier may be allocated for both sidelink communication between wireless communication devices 302*a*-302*c* and cellular communication (e.g., uplink and downlink communication) between the wireless communication devices 302*a*-302*c* and the base station 306. For example, the wireless communication system 300 may be configured to support a V2X network in which resources for both sidelink and cellular communication are scheduled by the base station 306. In other examples, the wireless communication devices 302*a*-302*c* may autonomously select sidelink resources (e.g., from one or more frequency bands or sub-bands designated for sidelink communication) for communication therebetween. In this example, the wireless communication devices 302*a*-302*c* may function as both scheduling entities and scheduled entities scheduling sidelink resources for communication with each other.

Figure 4:
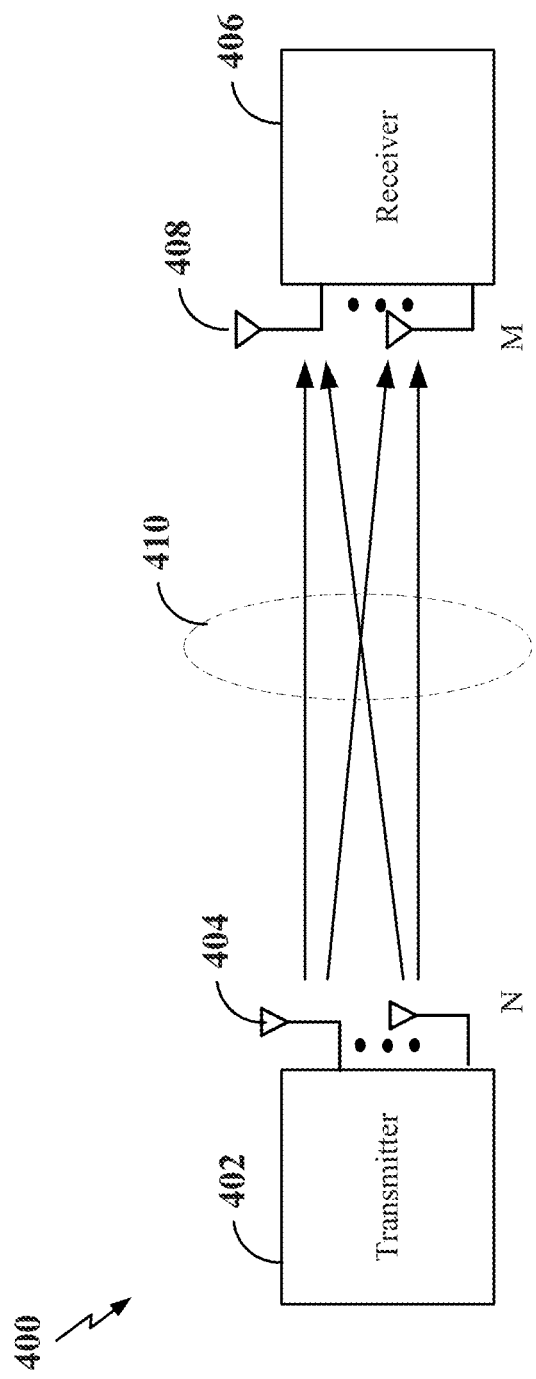
FIG. 4 is a block diagram illustrating a wireless communication system supporting beamforming and/or multiple-input multiple-output (MIMO) communication according to some aspects.

In some aspects of the disclosure, the scheduling entity and/or scheduled entity may be configured for beamforming and/or multiple-input multiple-output (MIMO) technology. FIG. 4 illustrates an example of a wireless communication system 400 supporting beamforming and/or MIMO. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. (Note that the M used in reference to MIMO should not be confused with the number of different DMRS patterns discussed below, which also uses the parameter M.) Each of the transmitter 402 and the receiver 406 may be implemented, for example, within a scheduling entity, a scheduled entity, or any other suitable device. In some examples, the transmitter and receiver are each wireless communication devices (e.g., UEs or V2X devices) communicating over a sidelink channel.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). The increase in capacity may be achieved by spatially precoding each data stream (e.g., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 400 is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In one example, as shown in FIG. 4, a rank-2 spatial multiplexing transmission on a 2×2 MIMO antenna configuration will transmit one data stream from each transmit antenna 404. Each data stream reaches each receive antenna 408 along a different signal path 410. The receiver 406 may then reconstruct the data streams using the received signals from each receive antenna 408.

Beamforming is a signal processing technique that may be used at the transmitter 402 or receiver 406 to shape or steer an antenna beam (e.g., a transmit beam or receive beam) along a spatial path between the transmitter 402 and the receiver 406. Beamforming may be achieved by combining the signals communicated via antennas 404 or 408 (e.g., antenna elements of an antenna array module) such that some of the signals experience constructive interference while others experience destructive interference. To create the desired constructive/destructive interference, the transmitter 402 or receiver 406 may apply amplitude and/or phase offsets to signals transmitted or received from each of the antennas 404 or 408 associated with the transmitter 402 or receiver 406.

In 5G New Radio (NR) systems, particularly for FR2 (millimeter wave) systems, beamformed signals may be utilized for most downlink channels, including the physical downlink control channel (PDCCH) and physical downlink shared channel (PDSCH). In addition, broadcast control information, such as the synchronization signal block (SSB), slot format indicator (SFI), and paging information, may be transmitted in a beam-sweeping manner to enable all scheduled entities (UEs) in the coverage area of a transmission and reception point (TRP) (e.g., a gNB) to receive the broadcast control information. In addition, for UEs configured with beamforming antenna arrays, beamformed signals may also be utilized for uplink channels, including the physical uplink control channel (PUCCH) and physical uplink shared channel (PUSCH). However, it should be understood that beamformed signals may also be utilized by enhanced mobile broadband (eMBB) gNBs for sub 6 GHz systems. In addition, beamformed signals may further be utilized in D2D systems, such as NR SL or V2X, utilizing FR2.

Figure 5:
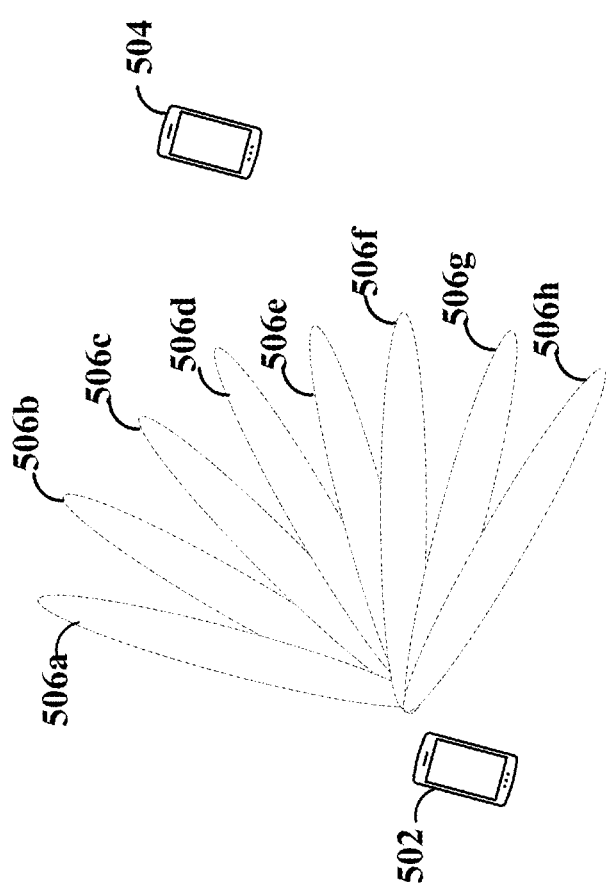
FIG. 5 is a diagram illustrating an example of a frame structure for use in a wireless communication network according to some aspects.

FIG. 5 is a diagram illustrating communication between wireless communication devices 502 and 504 using beamformed sidelink signals according to some aspects. Each of the wireless communication devices 502 and 504 may be any of the UEs, V2X devices, transmitting devices or receiving devices illustrated in any of FIGS. 1-4.

In the example shown in FIG. 5, the wireless communication devices 502 and 504 may be configured to communicate sidelink signals on one or more of a plurality of beams 506*a*-506*h*. Although the beams 506*a*-506*h* are illustrated in FIG. 5 as being generated on the wireless communication device 502, it should be understood that the same concepts described herein apply to beams generated on the wireless communication device 504. For example, each wireless communication device 502 and 504 may select one or more beams to transmit sidelink signals to the other wireless communication device. In some examples, due to channel reciprocity, the selected beam(s) on each wireless communication device 502 and 504 may be used for both transmission and reception of sidelink signals. It should be noted that while some beams are illustrated as adjacent to one another, such an arrangement may be different in different aspects. In some examples, the wireless communication devices 502 and 504 may generate more or less beams distributed in different directions.

The number of beams on which a particular wireless communication device 502 or 504 may simultaneously communicate may be defined based on NR SL standards and specifications and capabilities of the wireless communication devices 502 and 504. For example, the number of beams may be determined based on a number of antenna panels configured on the wireless communication device 502 or 504. As an example, a wireless communication device 502 or 504 may include one or two antenna panels, and as such, may be configured to communicate on one or two beams, respectively, at a time. Each beam may be utilized to transmit a respective layer for MIMO communication. Other numbers of simultaneous beams are also possible in the present disclosure.

In some examples, to select one or more beams for communication on a sidelink between the wireless communication devices 502 and 504, a first wireless communication device (e.g., the wireless communication device 502) may transmit a sidelink reference signal, such as a sidelink synchronization signal block (SSB) or sidelink channel state information (CSI) reference signal (RS), on each of the plurality of beams 506*a*-506*h* in a beam-sweeping manner towards a second wireless communication device (e.g., wireless communication device 504). The second wireless communication device 504 searches for and identifies the beams based on the beam reference signals. The wireless communication device 502 then performs beam measurements (e.g., reference signal received power (RSRP), signal-to-interference-plus-noise ratio (SINR), reference signal received quality (RSRQ), etc.) on the beam reference signals to determine the respective beam quality of each of the beams.

The second wireless communication device 504 may then transmit a beam measurement report to the first wireless communication device indicating the beam quality of one or more of the measured beams. The first wireless communication device or a radio access network (RAN) node (e.g., a base station, such as a gNB) may then select the particular beam(s) for communication between the first and second wireless communication devices on the sidelink based on the beam measurement report. For example, the first wireless communication device may forward the beam measurement report to the base station for selection of the beam(s). The base station may then signal the selected beam(s) via, for example, a radio resource control (RRC) message or via a medium access control (MAC) control element (CE).

Each selected beam on one of the wireless communication devices (e.g., wireless communication device 502) may form a beam pair link (BPL) with a corresponding selected beam on the other wireless communication device 504. Thus, each BPL includes corresponding transmit and receive beams on the wireless communication devices 502 and 504. For example, a BPL may include a first transmit/receive beam on the first wireless communication device 502 and a second transmit/receive beam on the second wireless communication device 504. To increase the data rate, multiple BPLs can be used to facilitate spatial multiplexing of multiple data streams. In some examples, the different BPLs can include beams from different antenna panels.

Various aspects of the present disclosure will be described with reference to an OFDM waveform, schematically illustrated in FIG. 6. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 6:
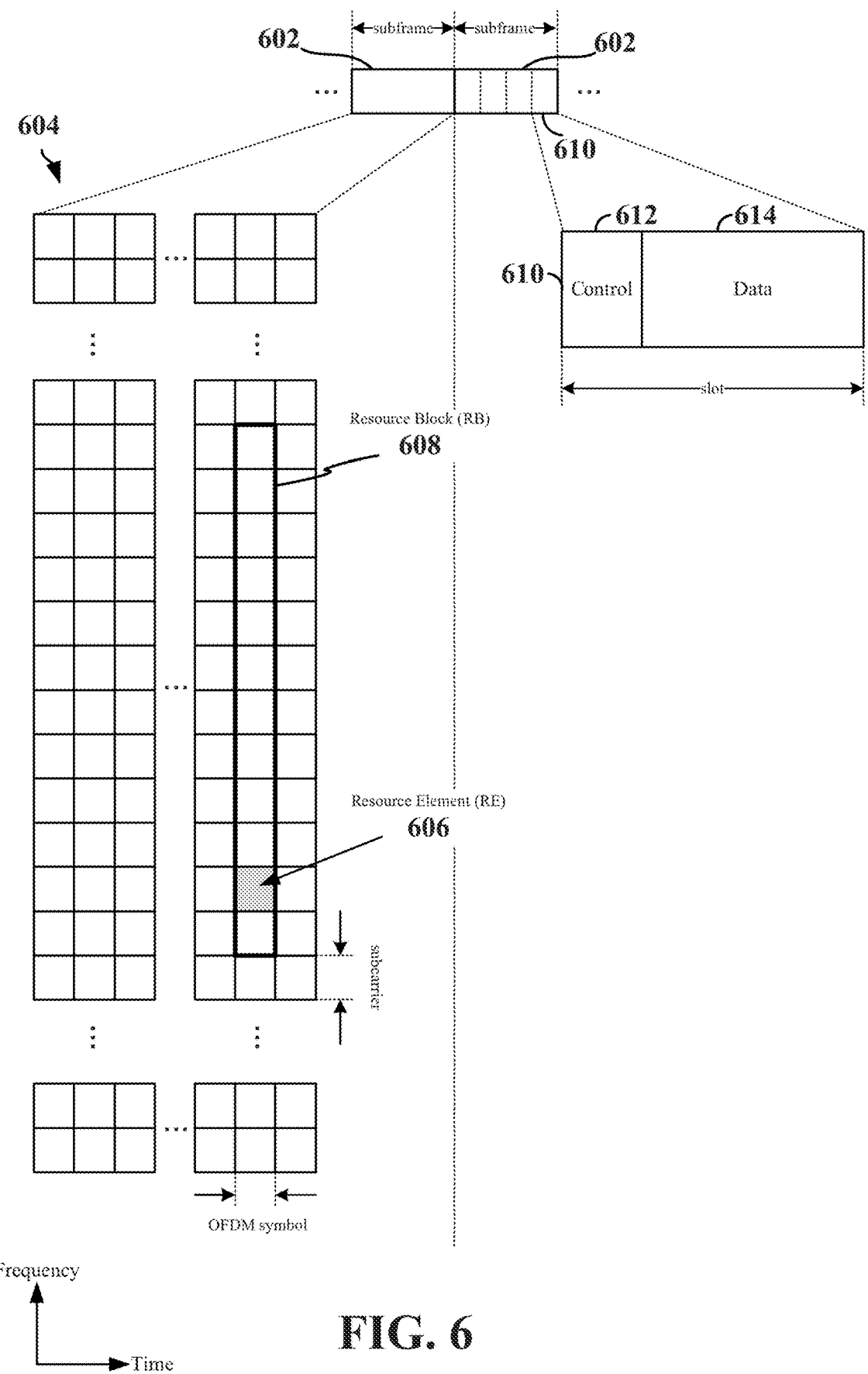
FIG. 6 is a diagram illustrating an expanded view of an exemplary subframe according to some aspects.

Referring now to FIG. 6, an expanded view of an exemplary subframe 602 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 604 may be used to schematically represent time-frequency resources for a given antenna port. That is, in a multiple-input-multiple-output (MIMO) implementation with multiple antenna ports available, a corresponding multiple number of resource grids 604 may be available for communication. The resource grid 604 is divided into multiple resource elements (REs) 606. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 608, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 608 entirely corresponds to a single direction of communication (either transmission or reception for a given device).

Scheduling of UEs or sidelink devices (hereinafter collectively referred to as UEs) for downlink, uplink, or sidelink transmissions typically involves scheduling one or more resource elements 606 within one or more sub-bands. Thus, a UE generally utilizes a subset of the resource grid 604. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In the illustration of FIG. 6, the RB 608 is shown as occupying less than the entire bandwidth of the subframe 602, with some subcarriers illustrated above and below the RB 608. In a given implementation, the subframe 602 may have a bandwidth corresponding to any number of one or more RBs 608. Further, the RB 608 is shown as occupying less than the entire duration of the subframe 602 (as one possible example).

Each 1 ms subframe 602 may consist of one or multiple adjacent slots. In the example shown in FIG. 6, one subframe 602 includes four slots 610, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). The mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 610 illustrates the slot 610 including a control region 612 and a data region 614. In general, the control region 612 may carry control channels, and the data region 614 may carry data channels. Of course, a slot may contain all DL, all UL, or at least one DL portion and at least one UL portion. The simple structure illustrated in FIG. 4 is merely exemplary in nature, and different slot structures may be utilized, and may include one or more of each of the control region(s) and data region(s).

Although not illustrated in FIG. 6, the various REs 606 within an RB 608 may be scheduled to carry one or more physical channels, including control channels, shared channels, data channels, etc. Other REs 606 within the RB 608 may also carry pilots or reference signals. The pilots or reference signals may provide for a receiving device to perform channel estimation of the corresponding channel, which may enable coherent demodulation/detection of the control and/or data channels within the RB 608.

In some examples, the slot 610 may be utilized for broadcast or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 606 (e.g., within the control region 612) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 606 (e.g., in the control region 612 or the data region 614) to carry other DL signals, such as a DMRS; a phase-tracking reference signal (PT-RS); a channel state information (CSI) reference signal (CSI-RS); a primary synchronization signal (PSS); and a secondary synchronization signal (SSS). A UE may utilize the PSS and SSS to achieve radio frame, subframe, slot, and symbol synchronization in the time domain, identify the center of the channel (system) bandwidth in the frequency domain, and identify the physical cell identity (PCI) of the cell. The synchronization signals PSS and SSS, and in some examples, the PBCH and a PBCH DMRS, may be transmitted in a synchronization signal block (SSB). The PBCH may further include a master information block (MIB) that includes various system information, along with parameters for decoding a system information block (SIB). The SIB may be, for example, a SystemInformationType 1 (SIB1) that may include various additional system information. Examples of system information transmitted in the MIB may include, but are not limited to, a subcarrier spacing, system frame number, a configuration of a PDCCH control resource set (CORESET) (e.g., PDCCH CORESET0), and a search space for SIB1. Examples of additional system information transmitted in the SIB1 may include, but are not limited to, a random access search space, downlink configuration information, and uplink configuration information. The MIB and SIB1 together provide the minimum system information (SI) for initial access.

In an UL transmission, the scheduled entity (e.g., UE) may utilize one or more REs 606 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. In some examples, the UCI may include a scheduling request (SR), e.g., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 606 (e.g., within the data region 614) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 606 within the data region 614 may be configured to carry other signals, such as one or more SIBs and DMRSs.

In an example of sidelink communication over a sidelink carrier via a PC5 interface, the control region 612 of the slot 610 may include a physical sidelink control channel (PSCCH) including SCI transmitted by an initiating (transmitting) sidelink device (e.g., V2X or other sidelink device) towards a set of one or more other receiving sidelink devices. The data region 614 of the slot 610 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 606 within slot 610. For example, HARQ feedback information may be transmitted in a PSFCH within the slot 610 from the receiving sidelink device to a transmitting sidelink device. In addition, one or more reference signals, such as reference signals for PSSCH DMRS, or a sidelink SSB and/or a sidelink CSI-RS, may be transmitted within the slot 610.

The physical channels described above are generally multiplexed and mapped to transport channels for handling at the medium access control (MAC) layer. Transport channels carry blocks of information called transport blocks (TB). The TBS, which may correspond to a number of bits of information, may be a controlled parameter, based on the modulation and coding scheme (MCS) and the number of RBs in a given transmission.

The channels or carriers illustrated in FIG. 6 are not necessarily all of the channels or carriers that may be utilized between devices, and those of ordinary skill in the art will recognize that other channels or carriers may be utilized in addition to those illustrated, such as other traffic, control, and feedback channels.

In 5G NR, there may be four resource allocation modes of operation for sidelink (e.g., PC5) communications. In a first mode, Mode 1, a radio access network (RAN) node (e.g., gNB) may allocate resources to wireless communication devices for sidelink communication between the wireless communication devices. In a second mode, Mode 2, the wireless communication devices may autonomously select sidelink resources for sidelink communication therebetween. Signaling on the sidelink is the same between the two modes. Mode 3 and Mode 4 are generally directed to LTE V2X, with Mode 4 being directed to self-scheduling of resources. Although Modes 3 and 4 are directed to V2X, the disclosures made herein may have applicability to either Mode 2 or Mode 4. From a receiver's point of view, there is no difference between the four modes.

In Mode 1, the RAN node may allocate sidelink resources in various manners. For example, the RAN node may allocate sidelink resources dynamically (e.g., a dynamic grant) to wireless communication devices, in response to requests for sidelink resources from the wireless communication devices. The RAN node may further activate preconfigured sidelink grants for sidelink communication among the wireless communication devices. In Mode 1, sidelink feedback may be reported back to the RAN node by a transmitting wireless communication device.

In Mode 2, a wireless communication device may schedule sidelink communication (e.g., PC5) by use of SCI. SCI may include two SCI stages. Stage 1 sidelink control information (first stage SCI) may be referred to herein as SCI-1. Stage 2 sidelink control information (second stage SCI) may be referred to herein as SCI-2.

SCI-1 may be transmitted on a physical sidelink control channel (PSCCH). SCI-1 may include information for resource allocation of a sidelink resource and for decoding of the second stage of sidelink control information (e.g., SCI-2). SCI-1 may identify a priority level (e.g., Quality of Service (QoS)) of a PSSCH. For example, ultra-reliable-low-latency communication (URLLC) traffic may have a higher priority than text message traffic (e.g., short message service (SMS) traffic). SCI-1 may also include a physical sidelink shared channel (PSSCH) resource assignment and a resource reservation period (if enabled). Additionally, SCI-1 may include a PSSCH DMRS pattern (if more than one pattern is configured). The DMRS may be used by a receiver for radio channel estimation for demodulation of the associated physical channel. As indicated, SCI-1 may also include information about the SCI-2, for example, SCI-1 may disclose the size of SCI-2 by indicating an amount of time-frequency resources that are allotted for SCI-2, a number of a PSSCH DMRS port(s), and a modulation and coding scheme (MCS) index. SCI-1 may include other information that is useful for establishing and decoding a PSSCH resource.

SCI-2 may also be transmitted on the PSCCH and may contain information for decoding the PSSCH. According to some aspects, SCI-2 includes a 16-bit layer 1 (L1) destination identifier (ID), an 8-bit L1 source ID, a hybrid automatic repeat request (HARQ) process ID, a new data indicator (NDI), and a redundancy version (RV). For unicast communications, SCI-2 may further include a CSI report trigger. For groupcast communications, SCI-2 may further include a zone identifier and a maximum communication range for NACK. SCI-2 may include other information that is useful for establishing and decoding a PSSCH resource. Further information regarding exemplary SCI formats may be found, for example, in 3GPP TS 36.213 Version 14.3.0 Release 14.

Figure 7C:
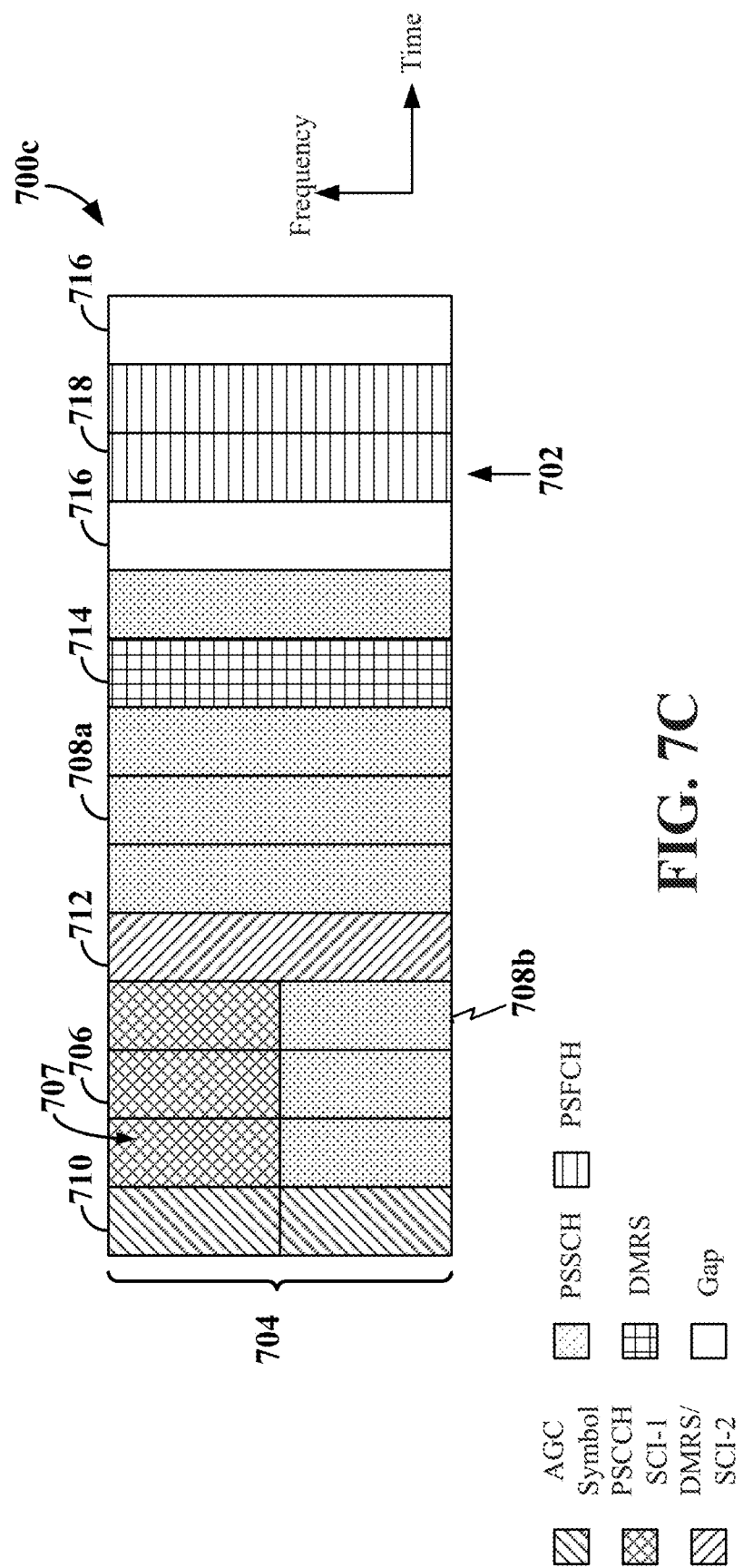

FIGS. 7A-7C illustrate examples of sidelink slot structures according to some aspects. The sidelink slot structures may be utilized, for example, in a V2X or other D2D network implementing sidelink. In the examples shown in FIGS. 7A-7C, time is in the horizontal direction with units of symbols 702 (e.g., OFDM symbols); and frequency is in the vertical direction. Here, a carrier bandwidth 704 allocated for sidelink communication is illustrated along the frequency axis. The carrier bandwidth 704 may include a plurality sub-channels, where each sub-channel may include a configurable number of PRBs (e.g., 10, 15, 20, 25, 50, 75, or 100 PRBs).

Each of FIGS. 7A-7C illustrates an example of a slot 700a-700c including fourteen symbols 702 that may be used for sidelink communication. However, it should be understood that sidelink communication can be configured to occupy fewer than fourteen symbols in a slot 700a-700c, and the disclosure is not limited to any particular number of symbols 702. Each sidelink slot 700a-700c includes a physical sidelink control channel (PSCCH) 706 occupying a control region 720 of the slot 700a-700c and a physical sidelink shared channel (PSSCH) 708 occupying a data region 722 of the slot 700a-700c. The PSCCH 706 and PSSCH 708 are each transmitted on one or more symbols 702 of the slot 700a. The PSCCH 706 includes, for example, SCI-1 that schedules transmission of data traffic on time-frequency resources of the corresponding PSSCH 708. As explained elsewhere herein, the PSCCH SCI may include a PSFCH overhead indicator, as indicated by arrow 707 in FIG. 7C. SCI is discussed in detail above. One or more previously reserved bits within SCI formats may be used to insert the PSFCH overhead indicator. As shown in FIGS. 7A-7C, the PSCCH 706 and corresponding PSSCH 708 are transmitted in the same slot 700a-700c.

In some examples, the PSCCH 706 duration is configured to be two or three symbols. In addition, the PSCCH 706 may be configured to span a configurable number of PRBs, limited to a single sub-channel. For example, the PSCCH 706 may span 10, 12, 15, 20, or 25 PRBs of a single sub-channel. A DMRS may further be present in every PSCCH symbol. In some examples, the DMRS may be placed on every fourth RE of the PSCCH 706. A frequency domain orthogonal cover code (FD-OCC) may further be applied to the PSCCH DMRS to reduce the impact of colliding PSCCH transmissions on the sidelink channel. For example, a transmitting wireless communication device may randomly select the FD-OCC from a set of pre-defined FD-OCCs. In each of the examples shown in FIGS. 7A-7C, the starting symbol for the PSCCH 706 is the second symbol of the corresponding slot 700a-700c and the PSCCH 706 spans three symbols 702.

The PSSCH 708 may be time-division multiplexed (TDMed) with the PSCCH 706 and/or frequency-division multiplexed (FDMed) with the PSCCH 706. In the examples shown in FIGS. 7A and 7C, the PSSCH 708 includes a first portion 708a that is TDMed with the PSCCH 706 and a second portion 708b that is FDMed with the PSCCH 706.

One and two layer transmissions of the PSSCH 708 may be supported with various modulation orders (e.g., QPSK, 16-QAM, 64-QAM and 256-QAM). In addition, the PSSCH 708 may include DMRSs 714 configured in a two, three, or four symbol DMRS pattern. For example, slots 700a and 700c shown in FIGS. 7A and 7C illustrate a two symbol DMRS pattern, while slot 700b shown in FIG. 7B illustrates a three symbol DMRS pattern. In some examples, the transmitting wireless communication device can select the DMRS pattern and indicate the selected DMRS pattern in SCI-1, according to channel conditions. The DMRS pattern may be selected, for example, based on the number of PSSCH 708 symbols in the slot 700a-700c. In addition, a gap symbol 716 is present after the PSSCH 708 in each slot 700a-700c.

Each slot 700a-700c further includes SCI-2 712 mapped to contiguous RBs in the PSSCH 708 starting from the first symbol containing a PSSCH DMRS. In the example shown in FIG. 7C, the first symbol containing a PSSCH DMRS is the fifth symbol occurring immediately after the last symbol carrying the PSCCH 706. Therefore, the SCI-2 712 is mapped to RBs within the fifth symbol. In the example shown in FIG. 7B, the first symbol containing a PSSCH DMRS is the second symbol, which also includes the PSCCH 706. In addition, the SCI-2/PSSCH DMRS 712 are shown spanning symbols two through five. As a result, the SCI-2/PSSCH DMRS 712 may be FDMed with the PSCCH 706 in symbols two through four and TDMed with the PSCCH 706 in symbol five.

The SCI-2 may be scrambled separately from the sidelink shared channel. In addition, the SCI-2 may utilize QPSK. When the PSSCH transmission spans two layers, the SCI-2 modulation symbols may be copied on both layers. The SCI-1 in the PSCCH 706 may be blind decoded at the receiving wireless communication device. However, since the format, starting location, and number of REs of the SCI-2 712 may be derived from the SCI-1, blind decoding of SCI-2 is not needed at the receiver (receiving wireless communication device).

In each of FIGS. 7A-7C, the second symbol of each slot 700a-700c is copied onto (repeated on) a first symbol 710 thereof for automatic gain control (AGC) settling. For example, in each of FIGS. 7A and 7C, the second symbol containing the PSCCH 706 FDMed with the PSSCH 708b may be transmitted on both the first symbol and the second symbol. In the example shown in FIG. 7B, the second symbol containing the PSCCH 706 FDMed with the SCI-2/PSSCH DMRS 712 may be transmitted on both the first symbol and the second symbol.

As shown in FIG. 7C, HARQ feedback may be transmitted on a PSFCH 718 in a configurable resource period of 0, 1, 2, or 4 slots. In sidelink slots (e.g., slot 700c) containing the PSFCH 718, one symbol 702 may be allocated to the PSFCH 718, and the PSFCH 718 may be copied onto (repeated on) a previous symbol for AGC settling. In the example shown in FIG. 7C, the PSFCH 718 is transmitted on the thirteenth symbol and copied onto the twelfth symbol in the slot 700c. A gap symbol 716 may further be placed after the PSFCH symbols 718.

For FR2 sidelink operation, the SCI-1 (PSCCH 706), SCI-2 (SCI-2/PSSCH DMRS 712), and sidelink data traffic (PSSCH 708) may each be transmitted on a selected beam. In some examples, the SCI-1, SCI-2, and sidelink data traffic may each be transmitted on the same beam. In other examples, one or more of the SCI-1, SCI-2, and sidelink data traffic may be transmitted on different beams. In addition, feedback information (PSFCH 718) corresponding to the sidelink data traffic may further be received on the same or a different beam than the sidelink data traffic. Various aspects of the present disclosure relate to configuration and indication of the selected beam(s) for transmitting the SCI-1, SCI-2, data traffic, and feedback information.

In sidelink networks, beam selection may be performed by the base station or wireless communication devices based on beams identified through a sidelink beam search and measurement procedure, as described above in connection with FIG. 5. For example, the receiving wireless communication device may identify and measure a plurality of beams of a transmitting wireless communication device. The receiving wireless communication device may then generate and transmit a beam measurement report to the transmitting wireless communication device indicating the beam quality (e.g., RSRP, SINR, or RSRQ) of one or more of the measured beams. The transmitting wireless communication device may either select one or more beams for communication with the receiving wireless communication device based on the beam measurement report or forward the beam measurement report to a serving base station (or RAN) for selection of the beam(s).

Figure 8:
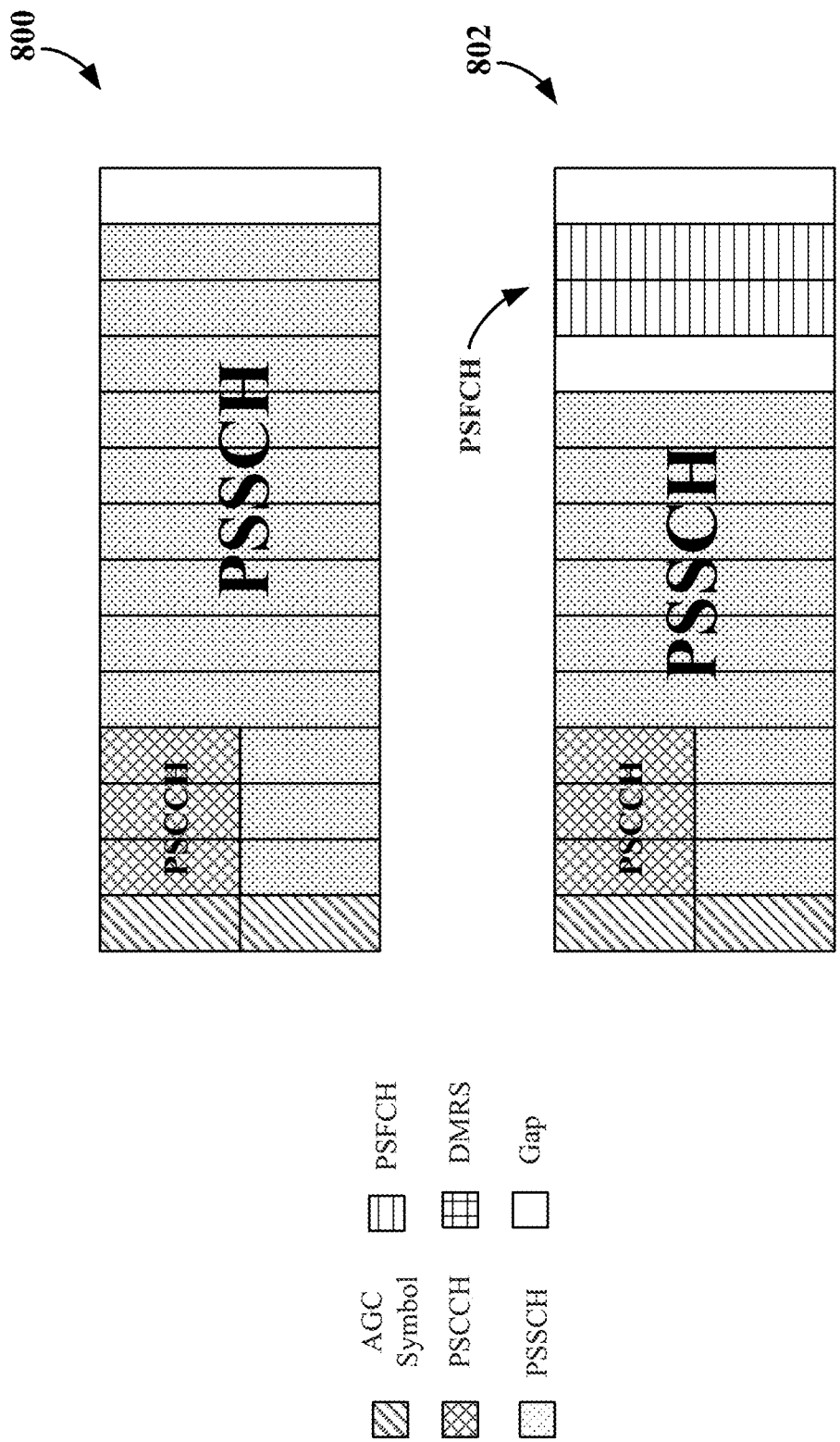
FIG. 8 illustrate additional examples of sidelink slot structures, wherein DMRSs are communicated.

FIG. 8 illustrates an exemplary slot 800 transmitted from a first wireless communication device (WCD1) to a second wireless communication device (WCD2), which includes twelve PSSCH information symbols. FIG. 8 also illustrates an exemplary slot 802 transmitted from the first wireless communication device (WCD2) to the first wireless communication device (WCD1), which includes two PSFCH information symbols, separated by a gap from the PSSCH information symbols. As such, the number of PSSCH information symbols in slot 802 is only nine.

Figure 9:
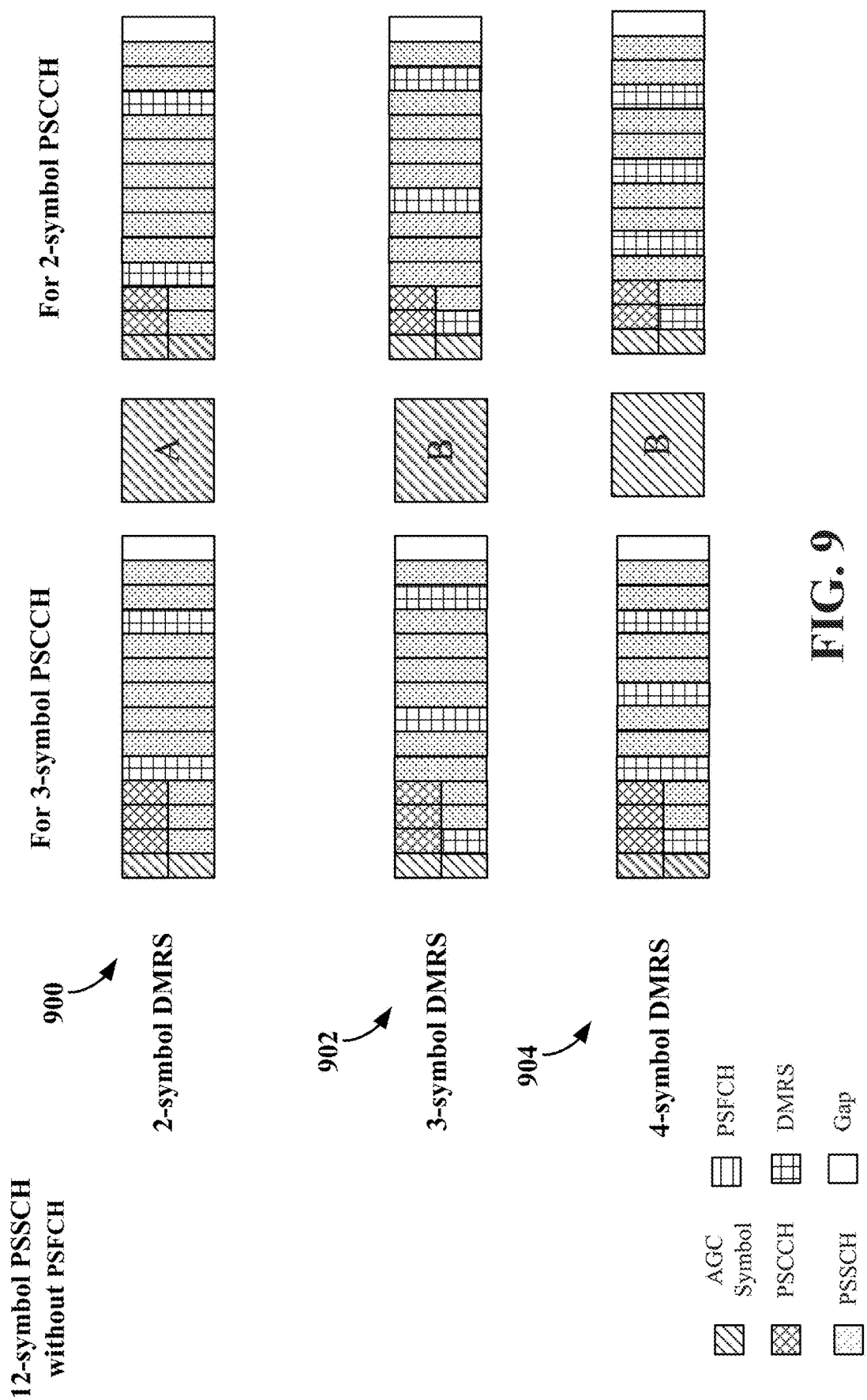
FIG. 9 illustrate additional examples of sidelink slot structures, particularly 2-symbol, 3-symbol, and 4-symbol DMRS examples for use with a 12-symbol physical sidelink shared channel (PSSCH).

FIG. 9 illustrates exemplary twelve-symbol slots transmitted by a first wireless communication device (WCD1) to a second wireless communication device (WCD2) for three different DMRS patterns. More specifically, the figure illustrates 2-symbol slots 902, 3-symbol slots 904, and 4-symbol slots 906. Different wireless communications within different regulatory jurisdictions may be configured to use different combinations of these. For example, in one jurisdiction (e.g., in a region or by a mobile network operator), all three might be enabled (e.g., pre-configured at devices, or configured by RRC signaling), whereas in another jurisdiction only the 2-symbol 902 and 3-symbol configurations might be implemented, thus affecting the amount of overhead to take into account when determining TBS. In this regard, although the return slots sent from WCD2 back to WCD1 (which may include PSFCH) are not shown in the figure, such slots have less available space for DMRS symbols due to the PSFCH symbols.

Figure 10:
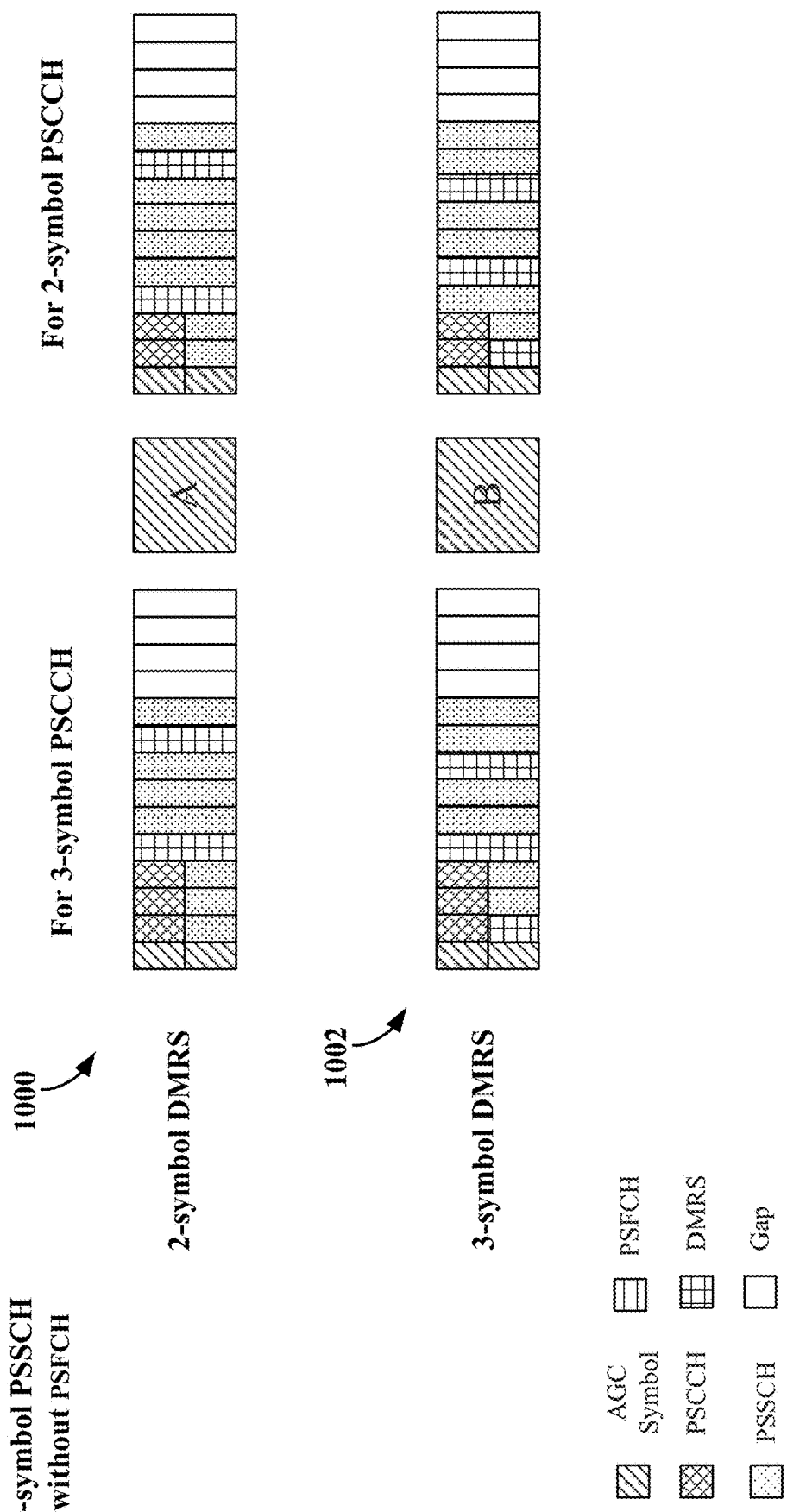
FIG. 10 illustrate still further examples of sidelink slot structures, particularly 2-symbol and 3-symbol DMRS examples for use with a 9-symbol PSSCH.

FIG. 10 illustrates exemplary nine-symbol slots transmitted by a first wireless communication device (WCD1) to a second wireless communication device (WCD2) for two different DMRS patterns. More specifically, the figure illustrates 2-symbol slots 1002 and 3-symbol slots 1004. 4-symbol slots are not used since 4-symbol slots are not accommodated with only nine symbols, thus affecting the amount of overhead to take into account when determining TBS. Notably, the overhead associated with slots when only 2-symbol and 3-symbol slots are available differs from the amount of overhead associated with slots when 2-symbol, 3-symbol and 4-symbol slots are available. Again, although the return slots sent from WCD2 back to WCD1 (which may include PSFCH) are not shown in the figure, such slots have less available space for DMRS symbols due to the PSFCH symbols.

Figure 11:
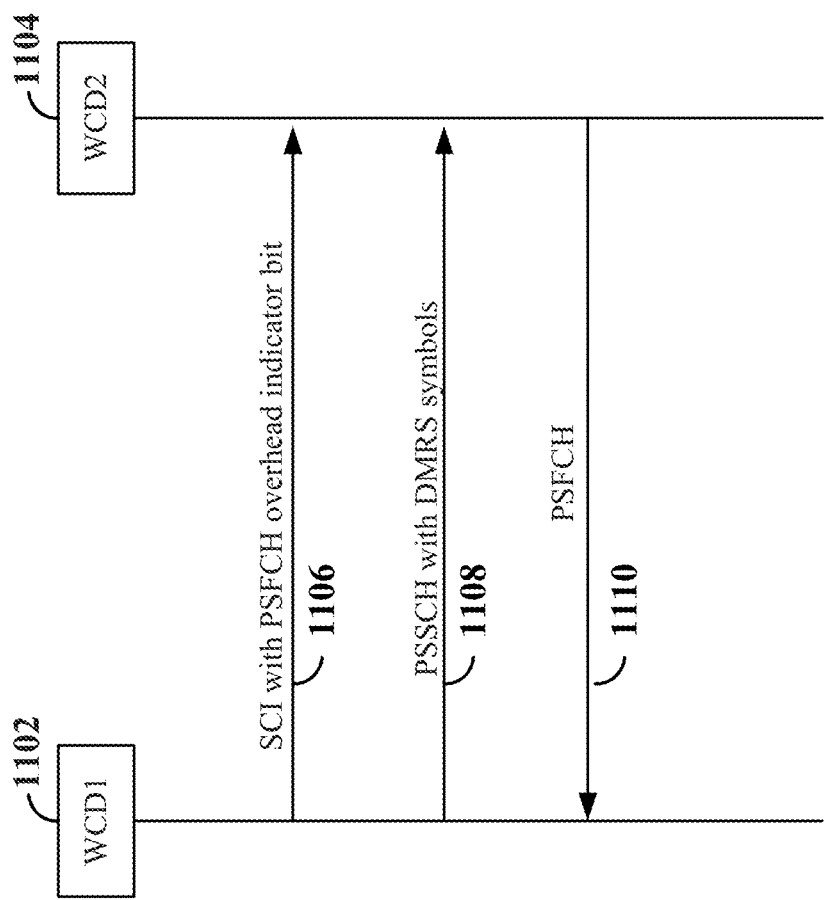
FIG. 11 is a signaling diagram illustrating an example of sidelink wireless communication according to some aspects, wherein a Physical Sidelink Feedback Channel (PSFCH) overhead indicator is employed in connection with DMRS and the determination of transport block size (TBS).

FIG. 11 is a signaling diagram illustrating an example of sidelink PSFCH overhead indication processing according to some aspects wherein the aforementioned issues regarding determining an average number of DMRS REs associated with DMRS overhead to use in determining TBS for both transmissions and re-transmissions are addressed. In the example shown in FIG. 11, a first wireless communication device (WCD1) 1102 is in wireless communication with a second wireless communication device (WCD2) 1104 over a sidelink channel. Each of WCD1 1102 and WCD2 1104 may correspond to any of the scheduled entities, UEs, V2X device, or D2D devices shown in FIGS. 1-5 or in other figures herein.

At 1106, the WCD1 1102, which may be a transmitting wireless communication device, transmits SCI to WCD2 114 that includes, for example, a bit indicating whether PSFCH resources overhead are to be used for TBS determination during transmissions and re-transmissions between the two devices. The SCI may contain further information related to the sidelink data traffic. The SCI may be transmitted, for example, within a PSCCH, as shown in FIG. 7C.

At 1108, the WCD1 1102 transmits a PSSCH carrying the sidelink data traffic to the WCD2 1104 using slots including DMRS symbols, in accordance with a pre-configured DMRS symbol protocol (as in FIGS. 9 and 10). Note that, as shown in FIG. 7C, PSCCH and PSSCH may be transmitted in the same slot.

At 1110, the WCD2 1104 transmits PSFCH, in accordance with the pre-configured PSFCH symbol protocol. Note that in some examples the WCD2 may transmit PSFCH only when PSFCH transmission is enabled or requested.

Figure 12:
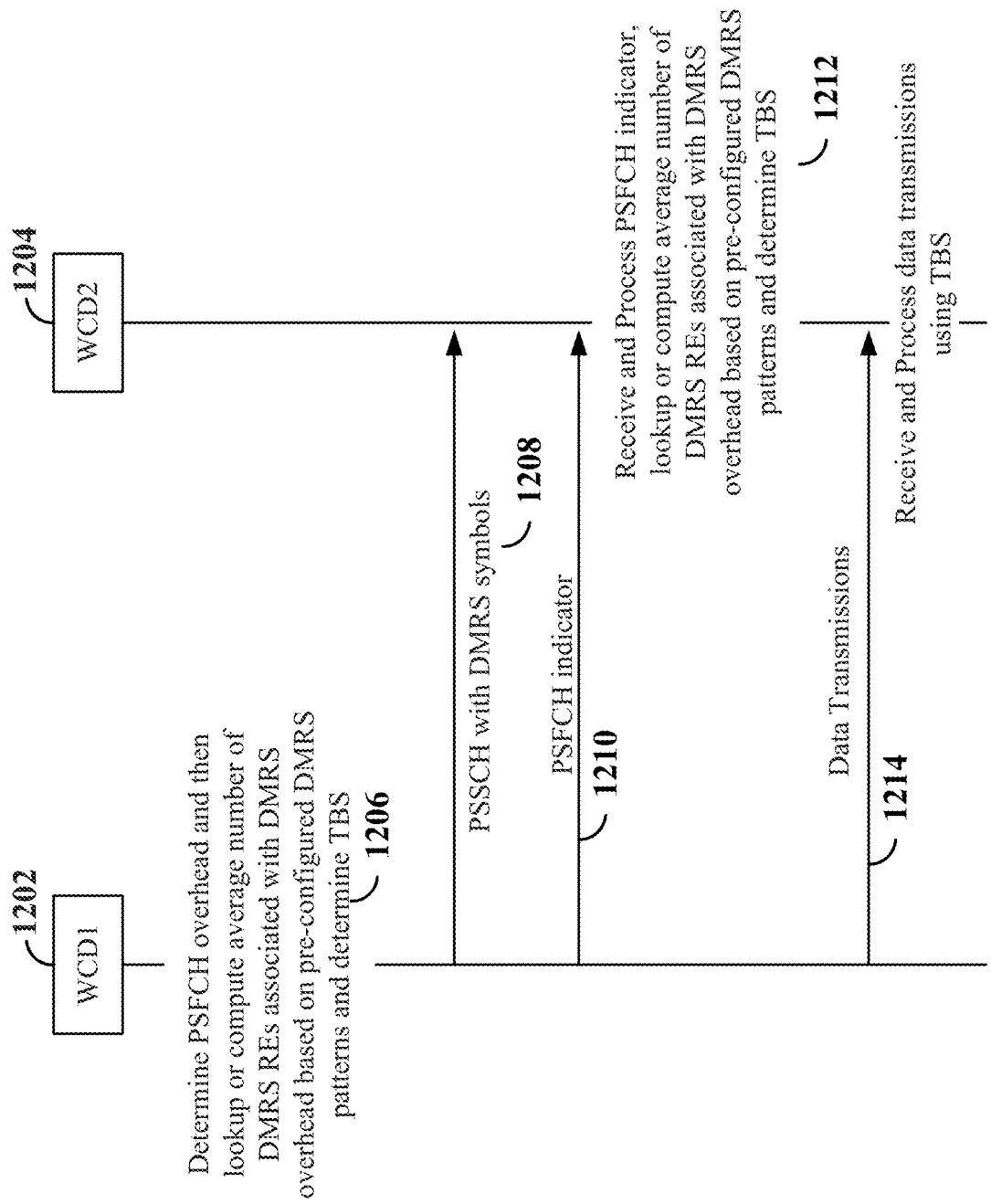
FIG. 12 is a signaling diagram illustrating another example of sidelink wireless communication according to some aspects, wherein a PSFCH overhead indicator is employed in connection with DMRS and the determination of TBS.

Although not shown in FIG. 11, but shown in FIG. 12, both WCD1 1102 and WCD2 1104 independently determine the same average number of DMRS REs associated with DMRS overhead to use in determining a TBS for the transmissions.

FIG. 12 is a signaling diagram illustrating an example of sidelink PSFCH overhead processing according to some aspects. In the example shown in FIG. 12, a first wireless communication device (WCD1) 1202 is in wireless communication with a second wireless communication device (WCD2) 1204 over a sidelink channel. Each of WCD1 1202 and WCD2 1204 may again correspond to any of the scheduled entities, UEs, V2X device, or D2D devices shown in FIGS. 1-5 or in other figures herein.

At 1206, the WCD1 1202, which may be a transmitting wireless communication device, determines PSFCH overhead and then lookups or computes the average number of DMRS REs associated with DMRS overhead based on pre-configured DMRS patterns and determines TBS. See, for example, 3GPP TS 38.214 V16.1.0 (2020-03), Technical Specification Group Radio Access Network; NR; Physical layer procedures for data; (Release 16) for a discussion of some physical channel sidelink procedures.

At 1208, the WCD1 1202 transmits a PSSCH carrying the sidelink data traffic to the WCD2 1204 on a selected beam using slots including DMRS symbols, in accordance with a pre-configured DMRS symbol protocol (as in FIGS. 9 and 10). At 1210, the WCD1 1202 transmits the PSFCH indicator. As explained above, the PSFCH indicator (also referred to herein as a PSFCH overhead indicator) may be provided within SCI. As shown in FIG. 7C, the SCI may be transmitted within the same time slot as PSSCH. Hence, operations 1208 and 1210 of FIG. 12 may be performed concurrently. At 1212, the WCD2 1204 receives and processes the PSFCH indicator, looks up or computes the same average number of DMRS REs associated with DMRS overhead based on pre-configured DMRS patterns and determines the same TBS. At 1214, the WCD2 1204 transmits data and, at 1218, the WCD2 1202 receives and processes the data using the TBS.

In this manner, the aforementioned issues regarding determining an average number of DMRS REs associated with DMRS overhead to use in determining TBS for both transmissions and re-transmissions are addressed, at least in part, by the provision of the PSFCH indicator provided within the SCI, and further by the provision of the same tables or same computational procedures within both WCD1 and WCD2.

Table I is an exemplary table that may be stored within both the transmit and receive wireless communication devices for use in looking up the average number of DMRS REs associated with DMRS overhead for use in determining the TBS. A first column lists the particular patterns configured for use in the sidelink system in terms of the number of DMRS symbols of the pattern. The second column provides a suitable average number of DMRS REs for use when the PSFCH overhead indicator is 0 (indicating PSFCH is not being used in TBS determination and hence more symbols are available for DMRS REs). The third column provides a suitable average number of DMRS REs for use when the PSFCH overhead indicator is 1 (indicating PSFCH is being used and hence fewer symbols are available for DMRS REs).

By way of example, as shown in the first row, when the system is configured for either 2-symbol, 3-symbol or 4-symbol patterns (as shown in FIG. 9), the average number of DMRS REs to use is 18 per slot per PRB if no PSFCH and 15 per slot per PRB with PSFCH. As another example, as shown in the second row, when the system is configured for either 2-symbol or 3-symbol patterns (as shown in FIG. 10), the average number of DMRS REs to use is 15 per slot per PRB if no PSFCH and 15 per slot per PRB with PSFCH. In this regard, since 4-symbol patterns are not permitted, the maximum number of permissible DMRS REs is smaller, and hence less overhead is needed.

TABLE I

| Configured Patterns (where the listed number is the number of DMRS symbols of the pattern) | Avg. Num. DMRS RE when PSFCH overhead indicator = 0 | Avg. Num. DMRS RE when PSFCH overhead indicator = 1 |
| --- | --- | --- |
| 2, 3, 4 | 18 | 15 |
| 2, 3 | 15 | 15 |
| 3, 4 | 21 | 18 |
| 2, 4 | 18 | 15 |
| 2 | 12 | 12 |
| 3 | 18 | 18 |
| 4 | 24 | 18 |
| ... | | |

Rather than providing a table, the first and second wireless communication devices may instead be configured to compute the same values as in Table I based on the particular DMRS patterns that are configured within the system. For example, if the system is configured for 2-symbol, 3-symbol or 4-symbol patterns, the devices compute the values shown in the first row. If the system is instead configured for only 2-symbol and 3-symbol patterns, the devices compute the values shown in the second row.

By way of example, the computations may be based on the following parameters and considerations. Assuming M DMRS patterns are pre-configured for PSSCH, each DMRS pattern has a DMRS overhead (number of REs) associated, $n_0, n_1, \ldots, n_{(M-1)}$ for M patterns. When PSFCH is not used in TBS determination, the associated DMRS overhead may be the actual number of REs occupied by DMRS (e.g., twelve for 2-symbol DMRS, eighteen for 3-symbol DMRS, and twenty-four for 4-symbols DMRS when no PSFCH). The average when PSFCH is used is then computed by averaging the values together.

For the example where 2-symbol, 3-symbol or 4-symbol patterns are permissible, the device averages the numbers 12, 18, and 24 together, thus computing 18 (which is shown in row one of the table) as the average value to use when PSFCH is not used. For the example where 2-symbol, 3-symbol or 4-symbol patterns are permissible and PSFCH is used, the device averages the numbers 12 and 18 together, thus computing 15 (which is also shown in row one of the table) as the average value to use when PSFCH is used. Less overhead is available in the example with 4-symbol patterns (when PSFCH is used) because the system needs to account for the possibility that the 4-symbol pattern is used, which can transmit a greater number of DMRS REs, and hence less overhead is available when some of the symbols are devoted to PSFCH.

For an example where 2-symbol or 3-symbol patterns are permissible (but not 4-symbol), the device averages the numbers 12 and 18 together, thus computing 15 as the average value to use (which is shown in row two of the table). Here, 15 is computed whether or not PSFCH is used, since the system need not account for the 4-symbol pattern and hence the same overhead value may be used with or without PSFCH.

Table I and the computations associated therewith represent a first set of examples by which the average number of DMRS REs associated with DMRS overhead may be determined by both the receive and transmit devices based on pre-configured DMRS patterns so as to determine the same TBS. In other examples, additional factors may be taken into account, such as the particular modulation used (e.g., PSK & QAM), the particular frequency domain DMRS pattern used (e.g., comb-2, comb-4, etc.), the number of side subchannels (if any) or number of PRBs, and the PSFCH resource overhead (e.g., whether the overhead is used in TBS determination, etc.). Generally speaking, any of a wide variety of computation schemes or table entries may be used, so long as both the receive and transmit devices uses the same computation schemes or table entries so as to determine (substantially) the same average value so as to determine the same TBS.

In some examples, rather than using the values of Table I, the system uses other "reference" values, where the listed average is, for example, lower than the values in Table I. That is, alternatively, the associated DMRS overhead may be a reference number of REs occupied by DMRS, which may be different from actual DMRS overhead (e.g., 10 REs for 2-symbol DMRS pattern) and where the reference values are different for DMRS patterns. So long as both the receive and transmit devices use the same table (or the same computation algorithms), the receive and transmit devices can determine the same TBS. That is, so long as both the receive and transmit devices determine the same TBS (and the TBS is otherwise satisfactory for sidelink communication), other values may be used as the average or mean number of DMRS REs associated with DMRS overhead.

In still other examples, the average number of DMRS REs to use is determined, at least in part, on an allocation size as specified by the transmitting UE. Generally speaking, when allocation size is larger, average DMRS overhead is slightly higher. Hence, in one example, the allocation size is compared to a threshold and, if the allocation size exceeds the threshold, the average number of DMRS REs for use with PSFCH/without PSFCH is selected or computed from a first set of (higher) values and, if the allocation size does not exceed the threshold, the average number of DMRS REs for use with PSFCH/without PSFCH is selected or computed from a second set of (lower) values.

By way of example, when the system is configured for either 2-symbol, 3-symbol or 4-symbol patterns (as shown in FIG. 9), the average number of DMRS REs to use with no PSFCH when the allocation size does not exceed the threshold may be set to 16, but may be set to 18 (as in Table I) when the allocation size exceeds the threshold. In the example, the average number of DMRS REs to use with PSFCH when the allocation size does not exceed the threshold may be set to 12, but may be set to 15 (as in Table I) when the allocation size exceeds the threshold. In an example where the allocation size may range from 20 RBs to 40 RBs, the threshold may be specified as a threshold number of RBs with a particular exemplary threshold of 20 RBs. Hence, if the allocation size is 20 RB or greater, a first value for the average number of DMRS REs is used, and second value is used if the allocation size is less than 20 RB (while again also taking into account whether PSFCH resources are being used).

Figure 13:
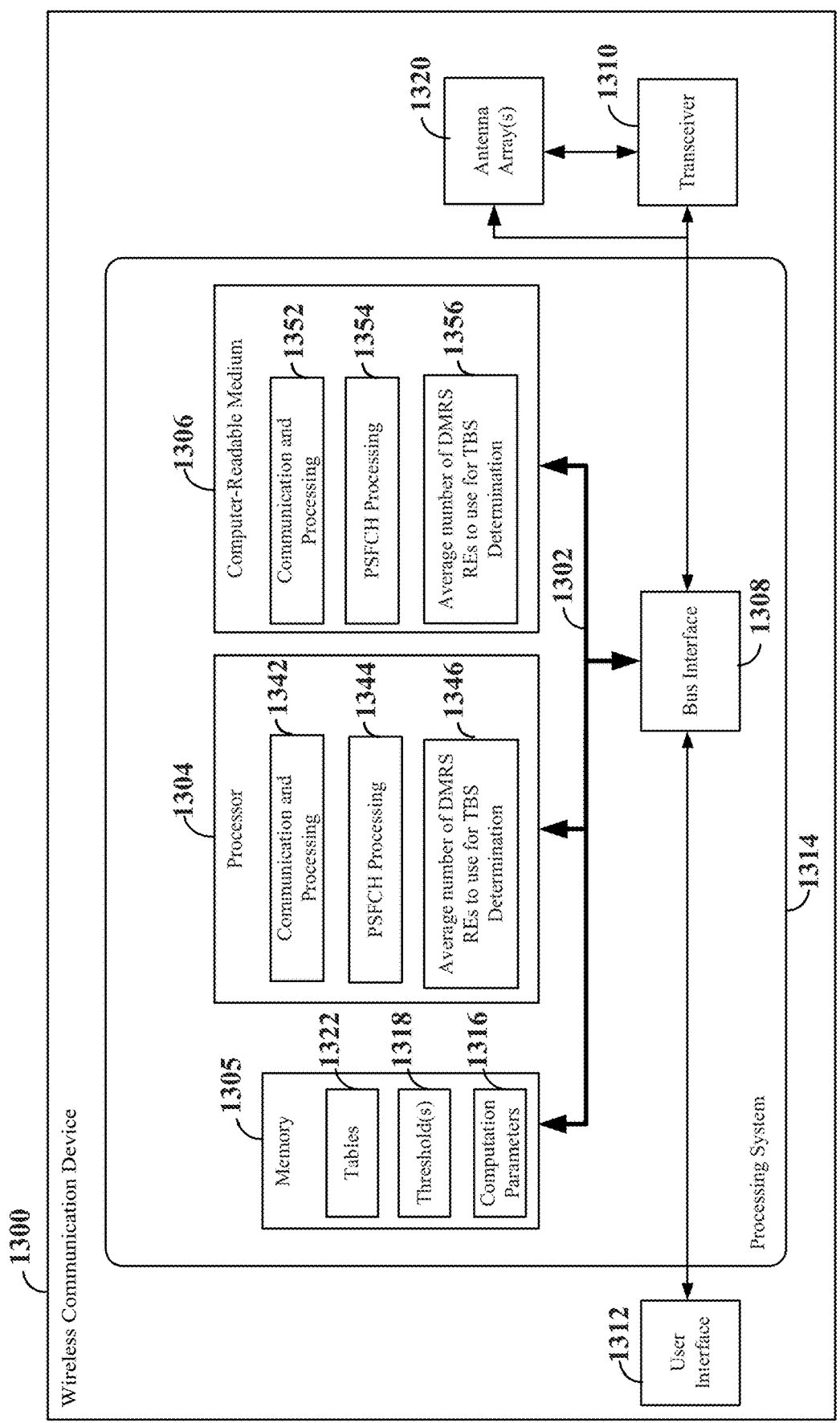
FIG. 13 is a block diagram illustrating an example of a hardware implementation for a wireless communication device employing a processing system according to some aspects, wherein a PSFCH overhead indicator is employed in connection with DMRS and the determination of TBS.

FIG. 13 is a block diagram illustrating an example of a hardware implementation for a wireless communication 1300 employing a processing system 1314. For example, the wireless communication device 1300 may correspond to a UE, V2X device, D2D device or other scheduled entity, as shown and described above in reference to FIGS. 1-5, and/or 8-10 or in other figures herein.

The wireless communication device 1300 may be implemented with a processing system 1314 that includes one or more processors 1304. Examples of processors 1304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 1300 may be configured to perform any one or more of the functions described herein. That is, the processor 1304, as utilized in the wireless communication device 1300, may be used to implement any one or more of the processes and procedures described below.

In the example of FIG. 13, the processing system 1314 may be implemented with a bus architecture, represented generally by the bus 1302. The bus 1302 may include any number of interconnecting buses and bridges depending on the specific application of the processing system 1314 and the overall design constraints. The bus 1302 links together various circuits including one or more processors (represented generally by the processor 1304), a memory 1305, and computer-readable media (represented generally by the computer-readable medium 1306). The bus 1302 may also link various other circuits such as timing sources, peripherals, voltage regulators, and power management circuits, which are well known in the art, and therefore, will not be described any further.

A bus interface 1308 provides an interface between the bus 1302 and a transceiver 1310 and one or more antenna arrays 1320 (e.g., one or more antenna panels). The transceiver 1310 provides a means for communicating with various other apparatus over a transmission medium (e.g., air interface). Depending upon the nature of the apparatus, a user interface 1312 (e.g., keypad, display, touch screen, speaker, microphone, control knobs, etc.) may also be provided. Of course, such a user interface 1312 is optional, and may be omitted in some examples.

The processor 1304 is responsible for managing the bus 1302 and general processing, including the execution of software stored on the computer-readable medium 1306. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software, when executed by the processor 1304, causes the processing system 1314 to perform the various functions described below for any particular apparatus. The computer-readable medium 1306 and the memory 1305 may also be used for storing data that is manipulated by the processor 1304 when executing software.

The computer-readable medium 1306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1306 may reside in the processing system 1314, external to the processing system 1314, or distributed across multiple entities including the processing system 1314. The computer-readable medium 1306 may be embodied in a computer program product. By way of example, a computer program product may include a computer-readable medium in packaging materials. In some examples, the computer-readable medium 1306 may be part of the memory 1305. Those skilled in the art will recognize how best to implement the described functionality presented throughout this disclosure depending on the particular application and the overall design constraints imposed on the overall system.

In some aspects of the disclosure, the processor 1304 may include circuitry configured for various functions. For example, the processor 1304 may include communication and processing circuitry 1342, configured to communicate with a RAN node (e.g., a base station, such as a gNB) via a cellular (e.g., Uu) interface and one or more other wireless communication devices via a sidelink (e.g., PC5) interface. In some examples, the communication and processing circuitry 1342 may include one or more hardware components that provide the physical structure that performs processes related to wireless communication (e.g., signal reception and/or signal transmission) and signal processing (e.g., processing a received signal and/or processing a signal for transmission).

In some examples, the communication and processing circuitry 1342 may be configured to generate and transmit reference signals (e.g., sidelink SSB and/or sidelink CSI-RS) on one or more sidelink beams in a beam-sweep manner using the transceiver 1310 and the antenna array(s) 1320 to a receiving wireless communication and to receive a beam measurement report from the receiving wireless communication device in response to the beam reference signals. In some examples, the communication and processing circuitry 1342 may be configured to receive the beam reference signals from a transmitting wireless communication device using the transceiver 1310 and antenna array(s) 1320, measure a respective beam quality (e.g., RSRP, SINR, or RSRQ) of each of the beam reference signals and to generate and transmit a beam measurement report including the respective beam quality of one or more of the beams to the transmitting wireless communication device via the transceiver 1310.

The communication and processing circuitry 1342 may further be configured to transmit a PSCCH including SCI, one or more DMRS, and sidelink data traffic on one or more beams to a receiving wireless communication device using the transceiver 1310 and the antenna array(s) 1320.

The processor 1304 additionally includes a PSFCH processing component 1344 configured to control the generation and processing of PSFCH symbols (which may depend on whether the device 1300 is operating as a transmitter device or a receiver device). The processor 1304 additionally includes an Average Number of DMRS REs to use for TB S Determination controller 1346 configured to determine the average number of DMRS REs to use for determining TBS using procedure already explained. In some examples, the controller 1346 accesses tables 1322 in memory 1305, which store the average number values (as in Table I). In some examples, the controller 1346 uses one or more thresholds 1318 in memory 1305, such as the aforementioned allocation size threshold. In some examples, the controller 1346 uses one or more computation parameters 1316 in memory 1305, such as the aforementioned computation parameters used to compute the same values that might otherwise be stored in tables 1322 (assuming such tables are not present). The computations may use the thresholds 1318, such as the allocation size threshold, as already explained.

At least some of the functions and operations of processor 1304 may be embodied within instructions within computer-readable medium 1306. For example, as shown, the computer-readable medium may include communication and processing instructions 1352 to transmit a PSCCH including SCI, one or more DMRS, and sidelink data traffic on one or more beams to a receiving wireless communication device using the transceiver 1310 and the antenna array(s) 1320. The medium 1306 may additionally include PSFCH processing instructions 1354 configured to control the generation and processing of PSFCH symbols (which may depend on whether the device 1300 is operating as a transmitter device or a receiver device). The processor 1304 additionally includes instructions 1356 for determining an average number of DMRS REs to use for TBS determination configured to determine the average number of DMRS REs to use for determining TBS using procedure already explained.

In one configuration, the wireless communication device 1300, includes means for sidelink beam configuration and indication as described in the present disclosure. In one aspect, the aforementioned means may be the processor 1304 shown in FIG. 13 configured to perform the functions recited by the aforementioned means. In another aspect, the aforementioned means may be a circuit or any apparatus configured to perform the functions recited by the aforementioned means. Of course, in the above examples, the circuitry included in the processor 1304 is merely provided as an example, and other means for carrying out the described functions may be included within various aspects of the present disclosure, including but not limited to the instructions stored in the computer-readable storage medium 1306, or any other suitable apparatus or means described in any one of the FIGS. 1-5, and/or 8-10, and utilizing, for example, the processes and/or algorithms described herein in relation to FIGS. 12-14, discussed above, and FIGS. 14-16, discussed in the following descriptions.

Figure 14:
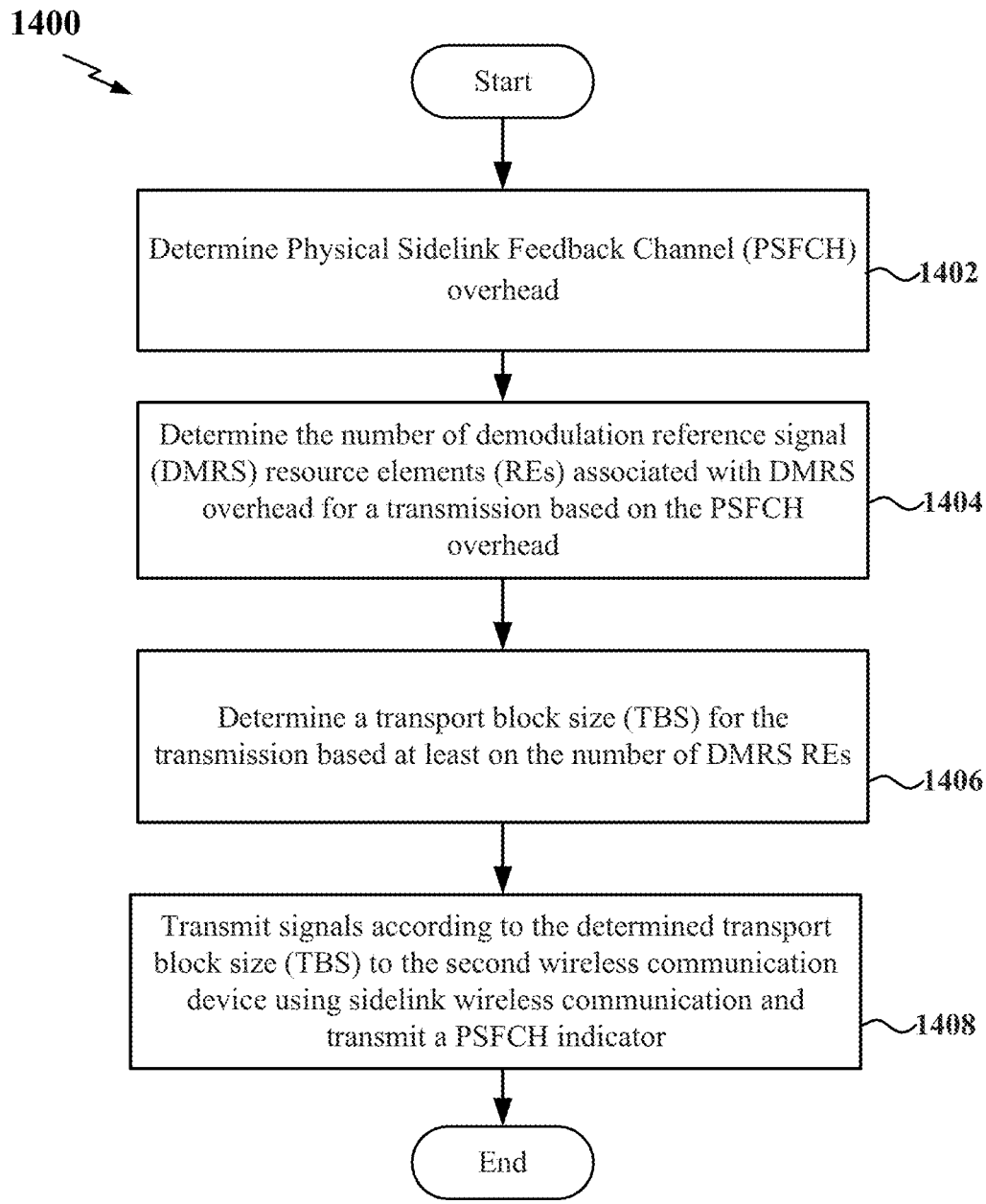
FIG. 14 is a flow chart of an exemplary method for sidelink communication according to some aspects, wherein a PSFCH overhead indicator is generated and sent by a transmitting wireless communication device.

FIG. 14 is a flow chart 1400 of an exemplary method for sidelink communication according to some aspects. Some or all illustrated features may be omitted in a particular implementation within the scope of the present disclosure, and some illustrated features may not be required for implementation of all embodiments. In some examples, the method may be performed by the wireless communication device 1300, as described above and illustrated in FIG. 13, by a processor or processing system, or by any suitable means for carrying out the described functions.

At block 1402, a first wireless communication device determines PSFCH overhead. As explained above, the determination of PSFCH overhead may include determining whether PSFCH resources and to be used in sidelink communications. Hence, in some aspects, the determination of PSFCH overhead is a determination of whether PSFCH overhead is needed in connection with the sidelink communications and the determination at block 1402 need not quantify the amount of PSFCH overhead.

At block 1404, the first wireless communication device may further determine the number of DMRS REs associated with DMRS overhead for a transmission based in part on the PSFCH overhead. At block 1406, the first wireless communication device may further determine a TBS for the transmission based in part on the number of DMRS REs. At block 1408, the first wireless communication device may transmit signals according to the determined TBS to the second wireless communication device using sidelink wireless communication and transmit a PSFCH overhead indicator. The PSFCH overhead indicator may be set to a first value to indicate the sidelink wireless communication system utilizes PSFCH resources and set to a second different value to indicate the sidelink wireless communication system does not utilize PSFCH resources.

Figure 15:
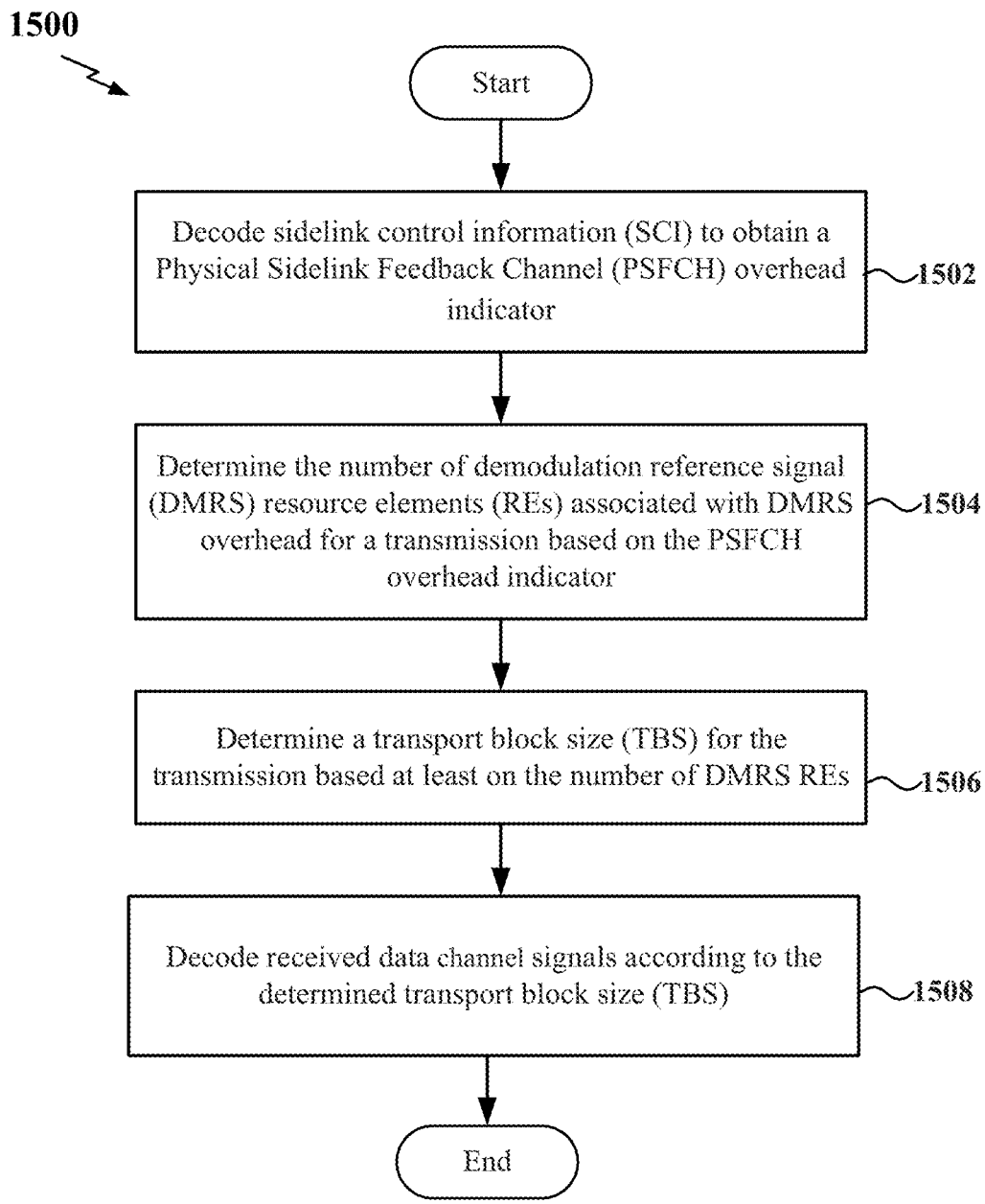
FIG. 15 is a flow chart of another exemplary method for sidelink communication according to some aspects, wherein a PSFCH overhead indicator is received and decoded by a receiving wireless communication device.

FIG. 15 is a flow chart 1500 of another exemplary method for sidelink communication according to some aspects. Again, some or all illustrated features may be omitted in a particular implementation within the scope of the present disclosure, and some illustrated features may not be required for implementation of all embodiments. In some examples, the method may be performed by the wireless communication device 1100, as described above and illustrated in FIG. 11, by a processor or processing system, or by any suitable means for carrying out the described functions.

At block 1502, a second wireless communication device (e.g., a receiving wireless communication device) may decode SCI to obtain a PSFCH overhead indicator. At block 1504, the second wireless communication device may determine a number of DMRS REs associated with DMRS overhead for a transmission based on the PSFCH overhead indicator. For example, the lookup tables described above may be used to look up a first average number of DMRS REs if the PSFCH overhead indicator is set to the first value and lookup a second different average number of DMRS REs if the PSFCH overhead indicator is set to the second different value. At block 1506, the second wireless communication device may determine a TBS for further transmissions with the first device based at least on the number of DMRS REs. For example, the TBS may be determined while using the average number of DMRS REs obtained at 1504 (in conjunction with other parameters). At block 1508, the second wireless communication device may process decode data channel signals received from the first device according to the determined TBS.

Figure 16:
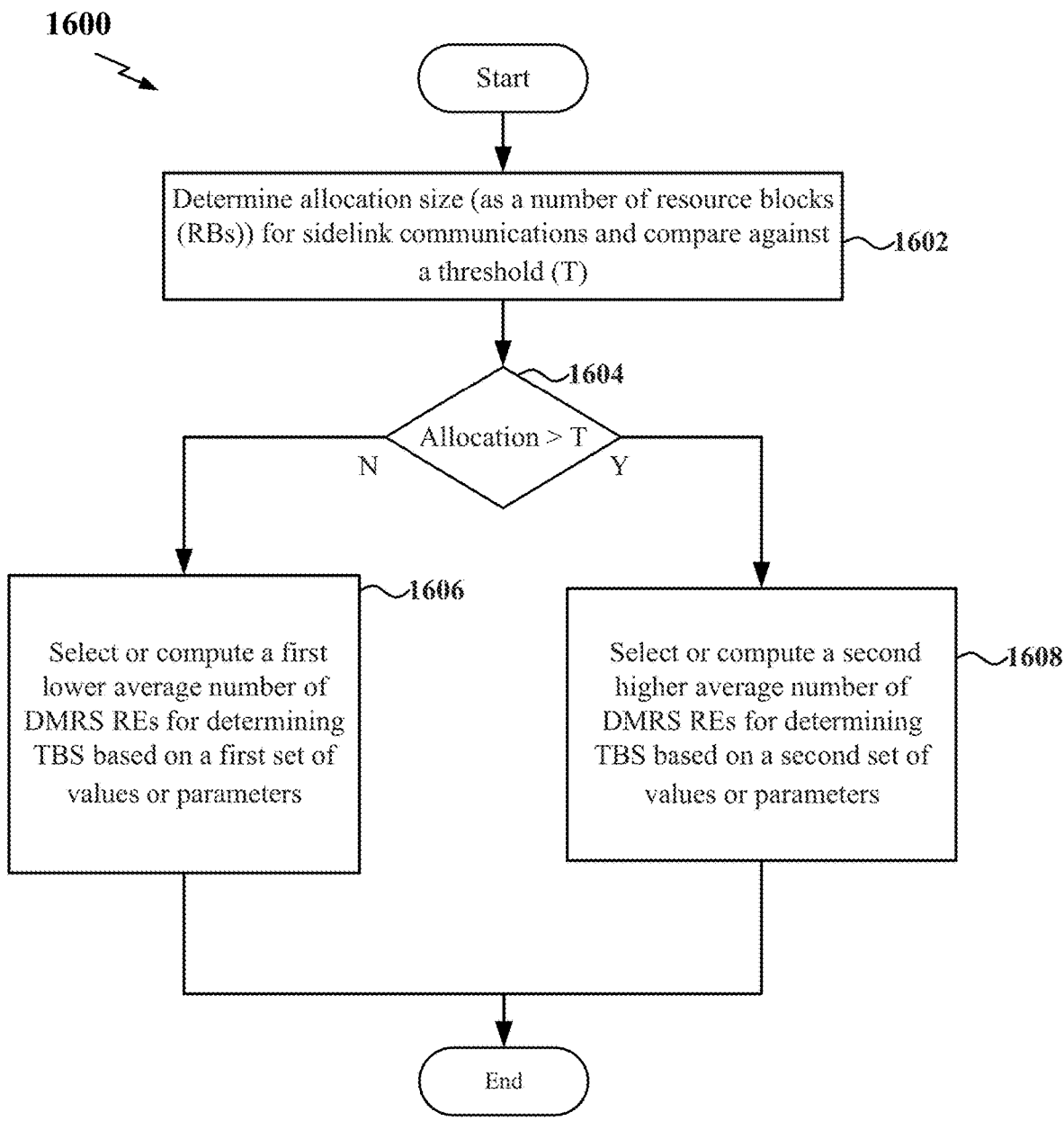
FIG. 16 is a flow chart of yet another exemplary method for sidelink communication according to some aspects, wherein allocation size is used in connection with the determination of a number of DMRS REs associated with DMRS overhead.

FIG. 16 is a flow chart 1600 of another exemplary method for sidelink communication according to some aspects. Again, some or all illustrated features may be omitted in a particular implementation within the scope of the present disclosure, and some illustrated features may not be required for implementation of all embodiments. In some examples, the method may be performed by the wireless communication device 1100, as described above and illustrated in FIG. 11, by a processor or processing system, or by any suitable means for carrying out the described functions.

At block 1602, a wireless communication device may determine an allocation size (as a number of RBs) for sidelink communications and compare against a threshold (T). Following decision block 1604, if the allocation size does not exceed the threshold, the wireless communication device at block 1606 may select or compute a first lower average number of DMRS REs for determining TBS based on a first set of values or parameters. Conversely, if the allocation size exceeds the threshold, the wireless communication device may, at block 1608, select or compute a second higher average number of DMRS REs for determining TBS based on a second set of values or parameters. See, above for examples of the threshold-based techniques.

Figure 17:
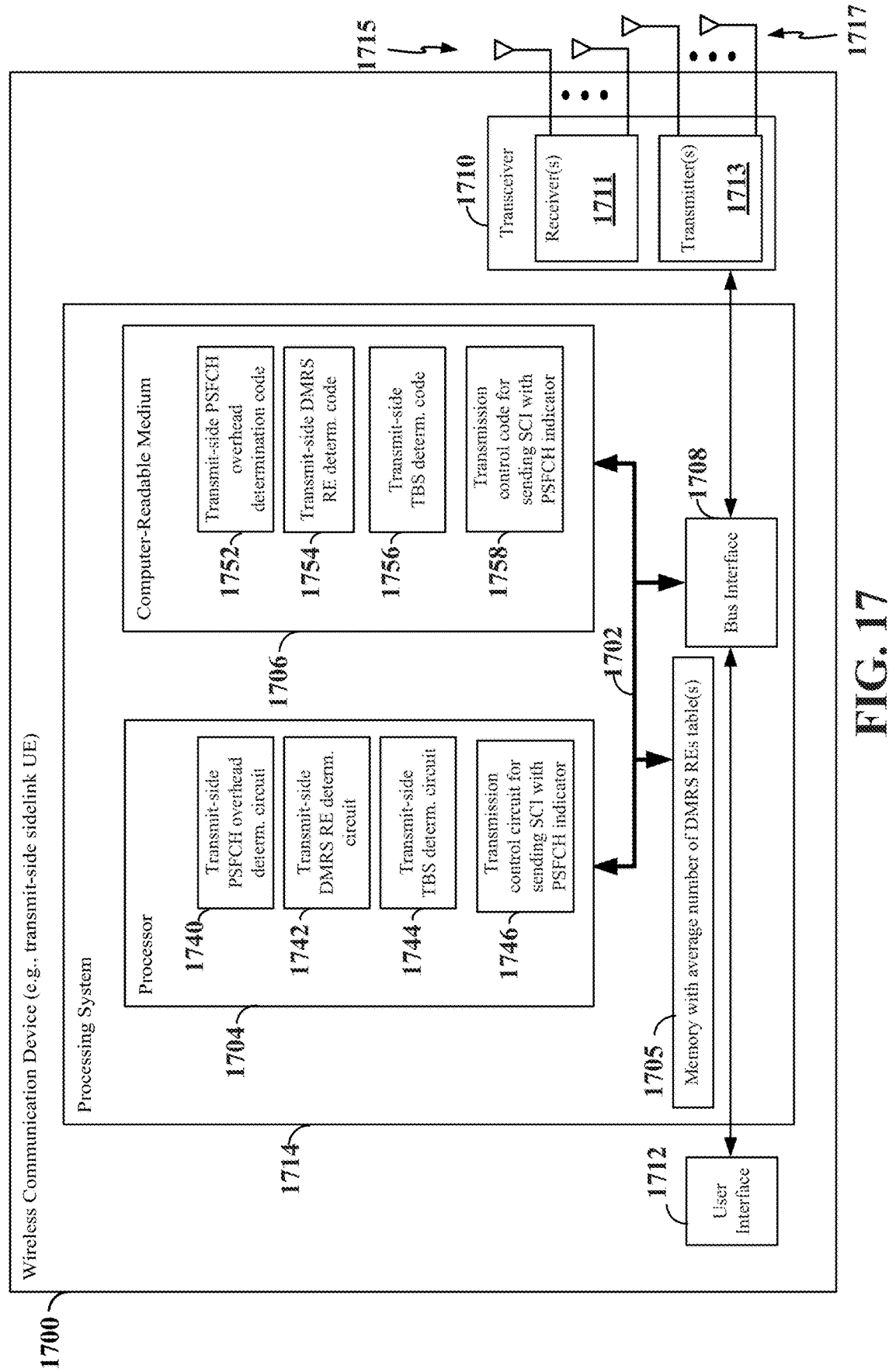
FIG. 17 is a block diagram illustrating an example of a hardware implementation for a transmitting wireless communication device employing a processing system according to some aspects, wherein a PSFCH overhead indicator is generated and sent by the transmitting device to a receiving wireless communication device.
Figure 18:
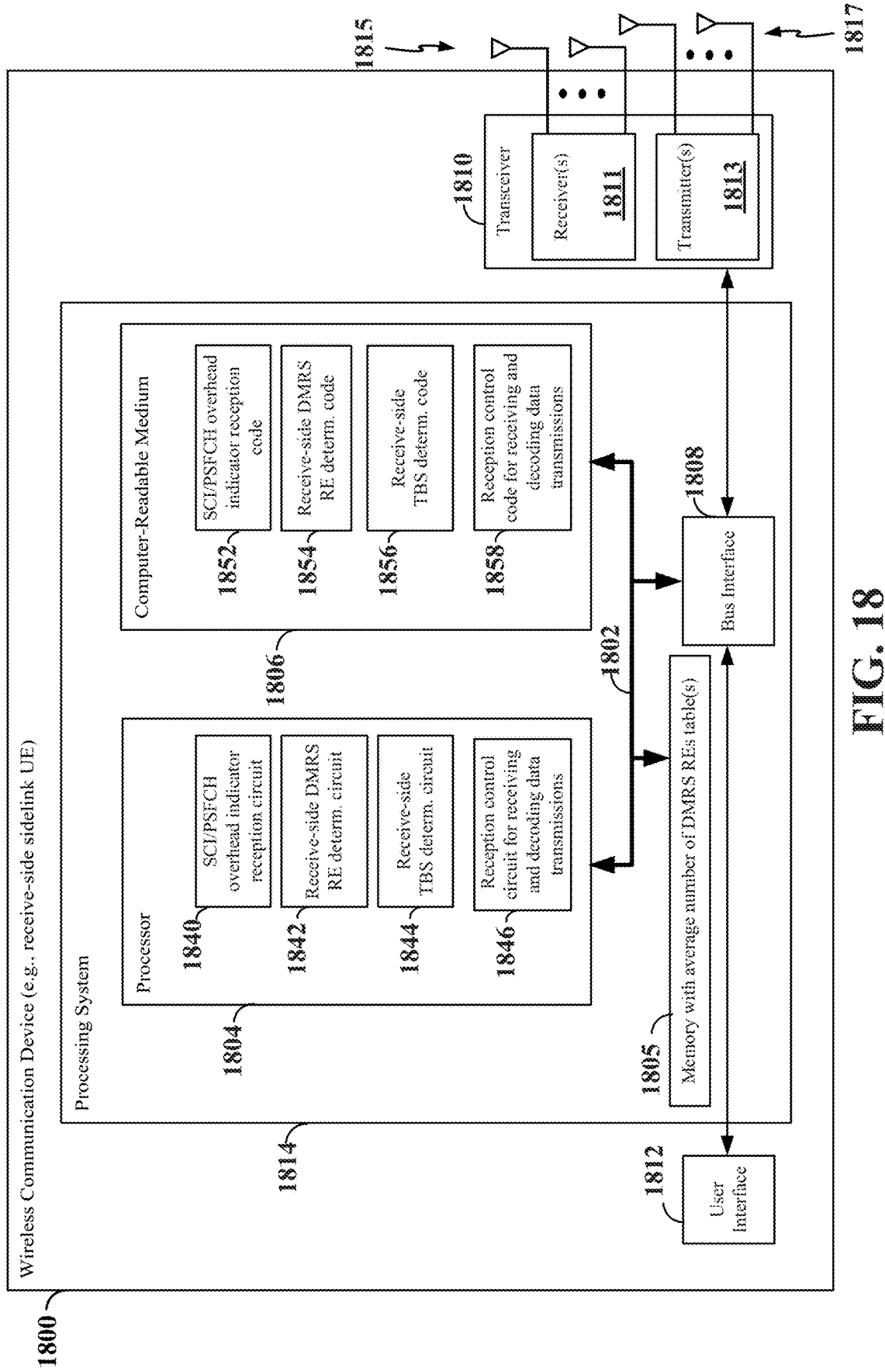
FIG. 18 is a block diagram illustrating an example of a hardware implementation for a receiving wireless communication device employing a processing system according to some aspects, wherein a PSFCH overhead indicator is received from a transmitting wireless communication device and decoded by the receiving device.

FIG. 17 is a block diagram illustrates an example of a hardware implementation for wireless communication device 1700 (e.g., a transmit-side UE configured for sidelink wireless communications with a receive-side UE, such as the one shown in FIG. 18). FIG. 17 highlights transmit-side components but it should be understood that the wireless communication device additionally may be provided with receive-side components (illustrated in FIG. 18) for use when it is the receiver of sidelink communications.

The wireless communication device 1700 employs a processing system 1714 capable of controlling and performing sidelink communications wherein, in some aspects, a PSFCH overhead indicator is used to indicate whether or not the sidelink wireless communication utilizes PSFCH resources. The transmit-side UE 1700 may be one or more of a scheduling entity, a UE, a CPE, a relay, a sidelink node, and an IAB node. The transmit-side UE 1700 may be implemented with a processing system 1714 that includes one or more processors 1704. Examples of processors 1704 include microprocessors, microcontrollers, DSPs, FPGAs, PLDs, state machines, gated logic, discrete hardware circuits, and other suitable hardware configured to perform the various functionality described throughout this disclosure. In various examples, the transmit-side UE 1700 may be configured to perform any one or more of the transmit side functions described herein. That is, the processor 1704, as utilized in an transmit-side UE 1700, may be used to implement any one or more of the transmit-side processes and procedures described elsewhere herein such as those shown in FIG. 14.

In the example of FIG. 17, the processing system 1714 may be implemented with a bus architecture, such as the bus architecture described above with reference to FIG. 13, and represented generally in FIG. 17 by the bus 1702. The bus 1702 communicatively couples together various circuits including one or more processors (represented generally by the processor 1704), a memory 1705, and computer-readable media (represented generally by the computer-readable medium 1706). A bus interface 1708 provides an interface between the bus 1702 and a transceiver 1710. The transceiver 1710 provides a communication interface or means for communicating with various other apparatus over a transmission medium. The transceiver 1710 includes one or more receivers 1711 and one or more transmitters 1713. The receiver(s) 1711 are coupled to a set of antennas 1715. The transmitter(s) 1713 are coupled to the same or a different set of antennas 1717. The sets of antennas may be used for beamforming. Depending upon the nature of the apparatus, a user interface 1712 (e.g., keypad, display, speaker, microphone, joystick) may also be provided.

In some aspects of the disclosure, the processor 1704 may include circuitry configured to implement one or more of the functions described elsewhere herein. The processor 1704 may include, for example, a transmit-side PSFCH overhead determination circuit 1740 configured to determine whether to use PSFCH overhead in determining the TBS. In some aspects, this may include generating or otherwise obtaining a PSFCH overhead indicator indicating whether PSFCH overhead is used in determining the TBS. In some aspects, the transmit-side PSFCH overhead determination circuit 1740 is configured to determine whether to use PSFCH overhead in the determination of the TBS based upon whether or not PSFCH resources are to be used for sidelink communications. In some aspects, the determination may be made, at least in part, based on signals or information received from a base station (not shown in FIG. 17) regarding allocated sidelink resources.

The processor 1704 may also include, for example, a transmit-side DMRS RE determination circuit 1742 configured to determine the number of DMRS REs associated with DMRS overhead for determining the TBS. In some aspects, the transmit-side DMRS RE determination circuit 1742 is configured to determine an average number of DMRS REs for use as the number of DMRS REs associated with DMRS overhead for use in determining the TBS. (The number of DMRS REs to be used for other purposes may differ.) In some aspects, the transmit-side DMRS RE determination circuit 1742 determines the average number of DMRS REs for use in determining the TBS based on a number of DMRS patterns available for use for sidelink wireless communication.

In some aspects, the transmit-side DMRS RE determination circuit 1742 determines the average number of DMRS REs from a lookup table as indicated within memory 1705. See, for example, exemplary Table I discussed above, which provides a different average number of DMRS REs (for use in determining the TBS) depending on whether the sidelink wireless communication utilizes PSFCH resources (which may be indicated by the PSFCH overhead indicator). However, as noted above, Table I is just an example. There is no requirement that the table store different values for the average number of DMRS REs (for use in determining the TBS) depending on whether the sidelink wireless communication utilizes PSFCH resources. In other examples, the same average number of DMRS REs may be used for determining the TBS regardless of the PSFCH indicator. That is, in some examples the table may have only two columns: a first column listing the configured patterns; and the second column listing the average number of DMRS REs for use in determining TBS for a particular configured pattern (regardless of whether the indicator is 1 or 0). The memory 1705 may also store thresholds or other computational parameters (similarly as in FIG. 13). In some aspects, the transmit-side DMRS RE determination circuit 1742 determines the average number of DMRS REs based, at least in part, on an allocation size. See, for example, FIG. 16 and its descriptions.

The processor 1704 may additionally include, for example, a transmit-side TBS determination circuit 1744 configured to determine a TBS based in part on the number of DMRS REs determined by circuit 1742 and on the PSFCH overhead indicator. The processor 1704 may include, for example, a transmission control circuit 1746 for sending SCI with a PSFCH overhead indicator, where circuit 1746 is configured to control the wireless transceiver 1710 to transmit signals that include a PSFCH overhead indicator to a receiving wireless communication device (e.g., UE 1800 of FIG. 18) using sidelink wireless communication, wherein the signals are transmitted according to the determined TBS. In some aspects, the PSFCH overhead indicator is configured to indicate whether PSFCH resources are to be used by the receiving wireless communication device for TBS determination. In some aspects, the transmission control circuit 1746 is configured to set or configure the PSFCH overhead indicator to a first value (e.g., a binary 1) to indicate the sidelink wireless communication utilizes PSFCH resources for determining the TBS or to a second different value (e.g., a binary 0) to indicate the sidelink wireless communication does not utilize PSFCH resources for determining the TBS. As already explained, the PSFCH overhead indicator may be transmitted within SCI within a PSCCH with a time slot along with a PSSCH, as shown in FIG. 7C.

The transmit-side UE 1700 and the receive-side UE (e.g., UE 1800 of FIG. 18) use the same predetermined procedure or procedures to determine the average number of DMRS REs so that both UEs determine the same value. In this regard, both UEs may include the same lookup tables storing the same information so that the two UEs obtain the same value for the number of DMRS REs associated with DMRS overhead. In some aspects, the same computational procedures are programmed into both UEs. In some aspects, the same threshold values are programmed into both UEs. In some examples, a first predetermined procedure is used when the sidelink wireless communication utilizes PSFCH resources for determining the TBS (and the indicator is set then to the first value) and a second predetermined procedure is used when the sidelink wireless communication does not utilize PSFCH resources for determining the TBS (and the indicator is set then to the second value).

The processor 1704 is also responsible for managing the bus 1702 and general processing, including the execution of software stored on the computer-readable medium 1706. The software, when executed by the processor 1704, causes the processing system 1714 to perform the various transmit-side functions described herein for any particular apparatus. The computer-readable medium 1706 and the memory 1705 may also be used for storing data that is manipulated by the processor 1704 when executing software.

One or more processors 1704 in the processing system may execute software. The software may reside on a computer-readable medium 1706. The computer-readable medium 1706 may be a non-transitory computer-readable medium such as the examples described above in connection with FIG. 13. The computer-readable medium 1706 may reside in the processing system 1714, external to the processing system 1714, or distributed across multiple entities including the processing system 1714. The computer-readable medium 1706 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The computer-readable storage medium 1706 may include software configured to implement one or more of the transmit-side functions described elsewhere herein. For example, the computer-readable storage medium 1706 may include: transmit-side PSFCH overhead determination code 1752 configured to determine whether to use PSFCH overhead in determining TBS and/or configured to generate or otherwise obtain a PSFCH overhead indicator indicating whether PSFCH overhead is used in determining TBS; transmit-side DMRS RE determination code 1754 configured to determine a number of DMRS REs associated with DMRS overhead for use in determining the TBS; transmit-side TBS determination code 1756 configured to determine the TBS for a transmission based in part on the number of DMRS REs and on the PSFCH overhead indicator; and transmission control code 1758 for sending SCI with a PSFCH indicator, wherein code 1758 is configured to control the wireless transceiver 1710 to transmit signals that include a PSFCH overhead indicator to a receiving wireless communication device (e.g., UE 1800 of FIG. 18) using sidelink wireless communication, and wherein the signals are transmitted according to the determined TBS. In some aspects, the PSFCH overhead indicator is configured to indicate whether PSFCH resources are to be used by the receiving wireless communication device for TBS determination. In some aspects, the transmission control code 1758 is configured to set the PSFCH overhead indicator to a first value (e.g., a binary 1) to indicate the sidelink wireless communication utilizes PSFCH resources for determining the TBS or to a second different value (e.g., a binary 0) to indicate the sidelink wireless communication does not utilize PSFCH resources for determining the TBS.

In some aspects, the transmit-side PSFCH overhead determination circuit 1740 provides a means for determining whether to use PSFCH overhead in determining a TBS and/or means for obtaining a PSFCH overhead indicator indicating whether PSFCH overhead is used in determining TBS. The transmit-side DMRS RE determination circuit 1742 provides a means for determining a number of DMRS REs associated with DMRS overhead for use determining the TBS. In some aspects, the transmit-side DMRS RE determination circuit 1742 provides means for determining an average number of DMRS REs for use as the number of DMRS REs associated with DMRS overhead. In some aspects, the transmit-side DMRS RE determination circuit 1742 provides means for determining the average number of DMRS REs based on a number of DMRS patterns available for use for sidelink wireless communication for determining the TBS. In some aspects, the transmit-side DMRS RE determination circuit 1742 provides means for determining the average number of DMRS REs from a lookup table. In some aspects, the transmit-side DMRS RE determination circuit 1742 provides means for determining the average number of DMRS REs based, at least in part, on an allocation size.

In some aspects, transmit-side TBS determination circuit 1744 provides means for determining the TBS based in part on the number of DMRS REs and on the PSFCH overhead indicator. The transmission control circuit 1746 for sending SCI with PSFCH indicator provides a means for controlling a wireless transceiver to transmit signals that include a PSFCH overhead indicator to a receiving wireless communication device using sidelink wireless communication, wherein the signals are transmitted according to the determined TBS. In some aspects, the transmission control circuit 1746 provides means for setting or configuring the PSFCH overhead indicator to indicate whether PSFCH resources are to be used by the receiving wireless communication device for TBS determination. In some aspects, the transmission control circuit 1746 provides means for setting the PSFCH overhead indicator to a first value (e.g., a binary 1) to indicate the sidelink wireless communication utilizes PSFCH resources for determining the TBS or to a second different value (e.g., a binary 0) to indicate the sidelink wireless communication does not utilize PSFCH resources for determining the TBS.

FIG. 18 is a block diagram illustrates an example of a hardware implementation for wireless communication device 1800 (e.g., a transmit-side UE configured for sidelink wireless communications with a transmit-side UE, such as the one shown in FIG. 18). FIG. 18 highlights receive-side components but it should be understood that the wireless communication device additionally may be provided with transmit-side components (illustrated in FIG. 17) for use when it is the transmitter of sidelink communications.

The wireless communication device 1800 employs a processing system 1814 capable of controlling and performing sidelink communications wherein, in some aspects, a PSFCH overhead indicator is received from the transmit-side UE used to indicate whether or not the sidelink wireless communication utilizes PSFCH resources for determining the TBS. The receive-side UE 1800 may be one or more of a scheduled entity, a UE, a CPE, a relay, a sidelink node, and an IAB node. The receive-side UE 1800 may be implemented with a processing system 1814 that includes one or more processors 1804. Examples of processors 1804 include microprocessors, microcontrollers, DSPs, FPGAs, PLDs, state machines, gated logic, discrete hardware circuits, and other suitable hardware configured to perform the various functionality described throughout this disclosure. In various examples, the receive-side UE 1800 may be configured to perform any one or more of the receive side functions described herein. That is, the processor 1804, as utilized in an receive-side UE 1800, may be used to implement any one or more of the receive-side processes and procedures described elsewhere herein such as those shown in FIG. 15.

In the example of FIG. 18, the processing system 1814 may be implemented with a bus architecture, such as the bus architecture described above with reference to FIG. 13, and represented generally in FIG. 18 by the bus 1802. The bus 1802 communicatively couples together various circuits including one or more processors (represented generally by the processor 1804), a memory 1805, and computer-readable media (represented generally by the computer-readable medium 1806). A bus interface 1808 provides an interface between the bus 1802 and a transceiver 1810. The transceiver 1810 provides a communication interface or means for communicating with various other apparatus over a transmission medium. The transceiver 1810 includes one or more receivers 1811 and one or more transmitters 1813. The receiver(s) 1811 are coupled to a set of antennas 1815. The transmitter(s) 1813 are coupled to the same or a different set of antennas 1817. The sets of antennas may be used for beamforming. Depending upon the nature of the apparatus, a user interface 1812 (e.g., keypad, display, speaker, microphone, joystick) may also be provided.

In some aspects of the disclosure, the processor 1804 may include circuitry configured to implement one or more of the functions described elsewhere herein. The processor 1804 may include, for example, a SCI/PSFCH overhead indicator reception circuit 1840 configured to receive and decode an SCI that includes a PSFCH overhead indicator. The processor 1804 may also include, for example, a receive-side DMRS RE determination circuit 1842 configured to determine a number of DMRS REs associated with DMRS overhead for use in determining the TBS. In some aspects, the receive-side DMRS RE determination circuit 1842 is configured to determine an average number of DMRS REs for use as the number of DMRS REs associated with DMRS overhead for determining the TBS. (The number of DMRS REs to be used for other purposes may differ.) In some aspects, the receive-side DMRS RE determination circuit 1842 determines the average number of DMRS REs based on a number of DMRS patterns available for use for sidelink wireless communication. In some aspects, the receive-side DMRS RE determination circuit 1842 determines, in response to the PSFCH overhead being set to a first value, that the sidelink wireless communication utilizes PSFCH resources for determining the TBS, and determines, in response to the PSFCH overhead indicator being set to a second value, that the sidelink wireless communication does not utilize PSFCH resources for determining the TBS.

In some aspects, the receive-side DMRS RE determination circuit 1842 determines the average number of DMRS REs from a lookup table as indicated within memory 1805. See, for example, the exemplary table discussed above, which provides a different average number of DMRS REs (for use in determining the TBS) depending on whether the sidelink wireless communication utilizes PSFCH resources (as indicated by the PSFCH overhead indicator). However, there is no requirement that the table store different values for the average number of DMRS REs for use in determining the TBS depending on whether or not the sidelink wireless communication utilizes PSFCH resources. Rather, in some examples, the same average number of DMRS REs may be used for determining the TBS regardless of the value of whether PSFCH feedback is to be used. The memory 1805 may also store thresholds or other computational parameters (similarly as in FIG. 13). In some aspects, the receive-side DMRS RE determination circuit 1842 determines the average number of DMRS REs based, at least in part, on an allocation size as discussed above in FIG. 16.

As already explained, the transmit-side UE (e.g., UE 1700 of FIG. 17) and the receive-side UE 1800 use the same predetermined procedure to determine the average number of DMRS REs for TBS determination so that both UEs determine the same value. As explained, both UEs may include the same lookup tables storing the same information so that the two UEs obtain the same value for the number of DMRS REs for use in determining TBS. In some examples, a first predetermined procedure is used when the sidelink wireless communication utilizes PSFCH resources (and the received indicator is thus set to the first value) and a second a second predetermined procedure is used when the sidelink wireless communication does not utilize PSFCH resources (and the received indicator is thus set to the second value).

The processor 1804 may further include, for example, a receive-side TBS determination circuit 1844 configured to determine the TB S based in part on the number of DMRS REs determined by circuit 1842 and the indicator received by circuit 1840. The processor 1804 may also include, for example, a reception control circuit 1846 for receiving and decoding data transmissions from the transmitting UE using the TBS.

The processor 1804 is also responsible for managing the bus 1802 and general processing, including the execution of software stored on the computer-readable medium 1806. The software, when executed by the processor 1804, causes the processing system 1814 to perform the various receive-side functions described herein for any particular apparatus. The computer-readable medium 1806 and the memory 1805 may also be used for storing data that is manipulated by the processor 1804 when executing software.

One or more processors 1804 in the processing system may execute software. The software may reside on a computer-readable medium 1806. The computer-readable medium 1806 may be a non-transitory computer-readable medium such as the examples described above in connection with FIG. 13. The computer-readable medium 1806 may reside in the processing system 1814, external to the processing system 1814, or distributed across multiple entities including the processing system 1814. The computer-readable medium 1806 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The computer-readable storage medium 1806 may include software configured to implement one or more of the receive-side functions described elsewhere herein. For example, the computer-readable storage medium 1806 may include: SCI/PSFCH overhead indicator reception code 1852 configured to receive and decode an SCI that includes a PSFCH overhead indicator; receive-side DMRS RE determination code 1854 configured to determine a number of DMRS REs associated with DMRS overhead for use in determining the TBS; receive-side TBS determination code 1856 configured to determine the TBS based in part on the number of DMRS REs and the PSFCH overhead indicator; and reception control code 1858 for receiving and decoding data transmissions from the transmitting UE using the TBS.

In some aspects, the SCI/PSFCH overhead indicator reception circuit 1840 provides a means for receiving and decoding an SCI that includes a PSFCH overhead indicator. The receive-side DMRS RE determination circuit 1842 provides a means for determining a number of DMRS REs associated with DMRS overhead for use in sidelink wireless communication. In some aspects, the receive-side DMRS RE determination circuit 1842 provides means for determining an average number of DMRS REs for use as the number of DMRS REs for use in determining the TBS. In some aspects, the receive-side DMRS RE determination circuit 1842 provides means for determining the average number of DMRS REs based on a number of DMRS patterns available for use for sidelink wireless communication. In some aspects, the receive-side DMRS RE determination circuit 1842 provides means for determining the average number of DMRS REs from a lookup table. In some aspects, the receive-side DMRS RE determination circuit 1842 provides means for determining the average number of DMRS REs based, at least in part, on an allocation size.

In some aspects, receive-side TBS determination circuit 1844 provides means for determining a TBS based in part on the number of DMRS REs. The reception control circuit 1846 provides means for receiving and decoding data transmissions from the transmitting UE using the TBS.

Figure 19:
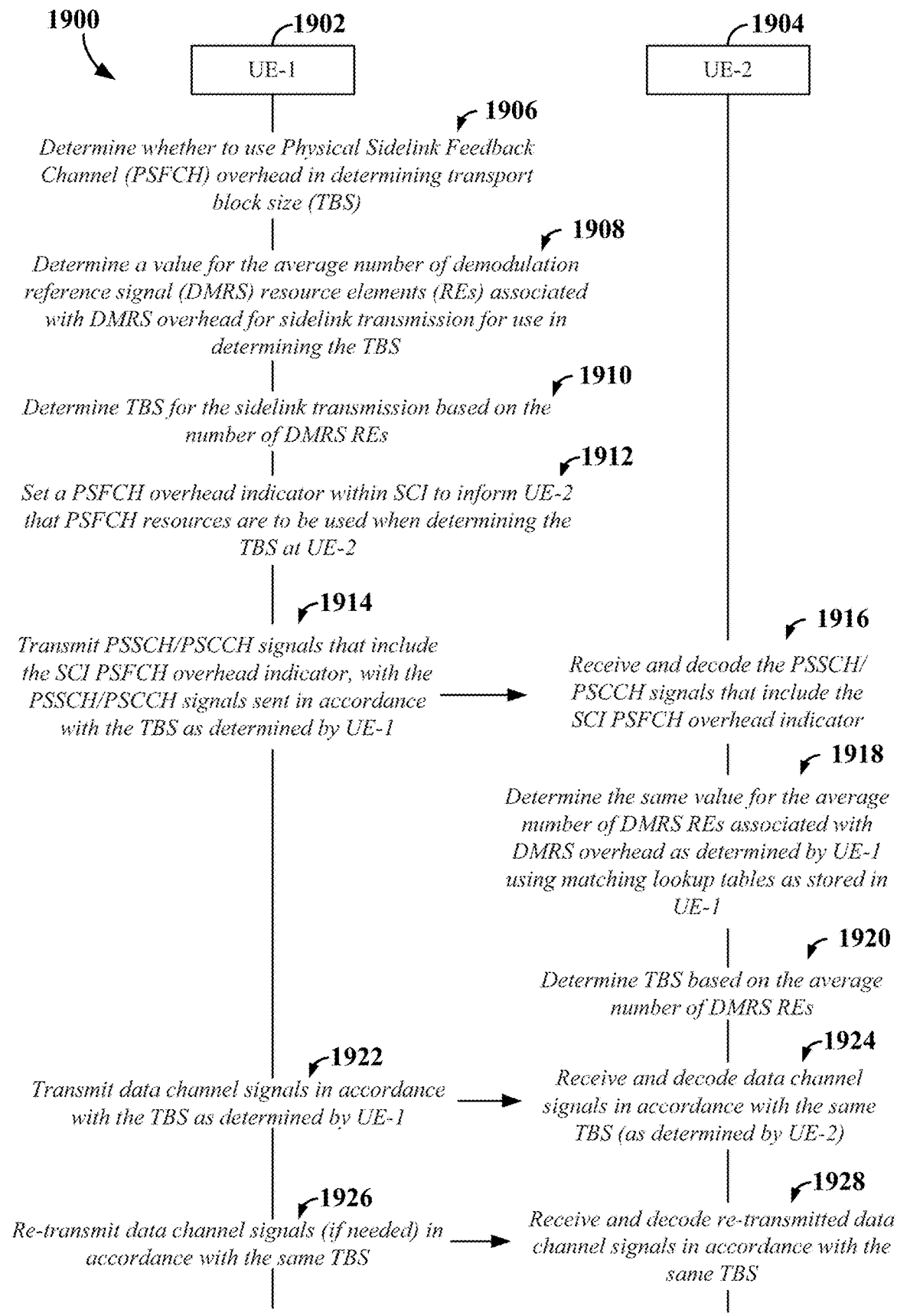
FIG. 19 is a timing diagram of sidelink communication according to some aspects, wherein a PSFCH overhead indicator is generated and sent by a transmitting wireless communication device and received and decoded by a receiving device.

FIG. 19 is a signaling diagram 1900 illustrating an example of sidelink wireless communication according to some aspects. In the example shown in FIG. 19, a first UE (UE-1) 1902 is configured for wireless communication with a second UE (UE-2) 1904 over a sidelink channel. Each of UE-1 1902 and UE-2 1904 may correspond to the various wireless devices described above. For example, UE-1 1902 may correspond to the wireless device 1700 of FIG. 17 and UE-2 1904 may correspond to the wireless device 1800 of FIG. 18. At 1906, the UE-1 1902 determines whether to use PSFCH overhead in determining TBS. As explained above, in a first mode, Mode 1, a RAN node (e.g., gNB) may allocate resources to UEs for sidelink communication between the UEs. In a second mode, Mode 2, the UEs may autonomously select sidelink resources for sidelink communication therebetween. Hence, in at least some examples, the determination by UE-1 of whether to use PSFCH overhead in determining TBS may include receiving information from the base station regarding allocated sidelink resources (such as PSFCH overhead). At 1908, the UE-1 1902 determines a value for the average number of DMRS REs associated with DMRS overhead for sidelink transmission for use in determining TBS. The determination of the average number may employ lookup tables or other suitable procedures, as already described.

At 1910, the UE-1 1902 determines the TBS for the sidelink transmission based on the number of DMRS REs determined at 1908 and, at 1912, the UE-1 1902 set a PSFCH overhead indicator within SCI to inform UE-2 1904 that PSFCH resources are to be used when determining TBS at UE-2. The PSFCH overhead indicator may be set to a first value (e.g., binary 1) to notify the UE-2 1904 that PSFCH resources are to be used in the determination of TBS at UE-2, or to a second different value (e.g., binary 0) to notify the UE-2 1904 that PSFCH resources are not to be used in the determination of TBS at UE-2. At 1914, the UE-1 1902 transmits PSSCH/PSCCH signals to the UE-2 1904 that include the SCI PSFCH overhead indicator, with the PSSCH/PSCCH signals sent in accordance with the TBS as determined by UE-1 at 1910.

At 1916, the UE-2 1904 receives and decodes the PSSCH/PSCCH signals that sent from the UE-1 1902 that include the SCI PSFCH overhead indicator. At 1918, the UE-2 1904 determines the same value for the average number of DMRS REs associated with DMRS overhead as determined by UE-1 at 1908 by using matching lookup table information as stored in UE-1 or other suitable matching procedures that are the same as the particular procedures used by the UE-1 1902. At 1920, the UE-2 1904 determines the TBS based on the determined average number of DMRS REs and, since the UE-2 1904 has computed the same average number of DMRS REs as computed by the UE-1 1902, the UE-2 1904 thereby obtains the same TBS.

At 1922, the UE-1 1902 transmits data channel signals in accordance with the TBS as previously determined by UE-1 at 1910, which are received and decoded by the UE-2 1904 at 1924 in accordance with the same TBS (as previously determined by UE-2 at 1920). At 1926, if re-transmission of data is needed, the UE-1 1902 re-transmits the data channel signals in accordance with the TBS as determined by UE-1 at 1910, which are then received and decoded by the UE-2 1904 at 1928 in accordance with the same TBS (as previously determined by UE-2 at 1920). Although not shown in FIG. 19, the UE-2 1904 may transmit PSFCH signals to UE-1 1902, in accordance with a pre-configured PSFCH symbol protocol, as shown in FIG. 11. In some aspects, UE-2 1904 may transmit PSFCH to UE-1 1902 only when PSFCH transmission is enabled or requested. Note, also, that in some aspects, at least some data or signals may be sent from the UE-1 1902 to the UE-2 1904 over sidelink channels (such as a sidelink data channel) before the PSFCH overhead indicator is sent. It should also be understood that in some systems, the PSFCH overhead indicator features may be disabled and not used.

Figure 20:
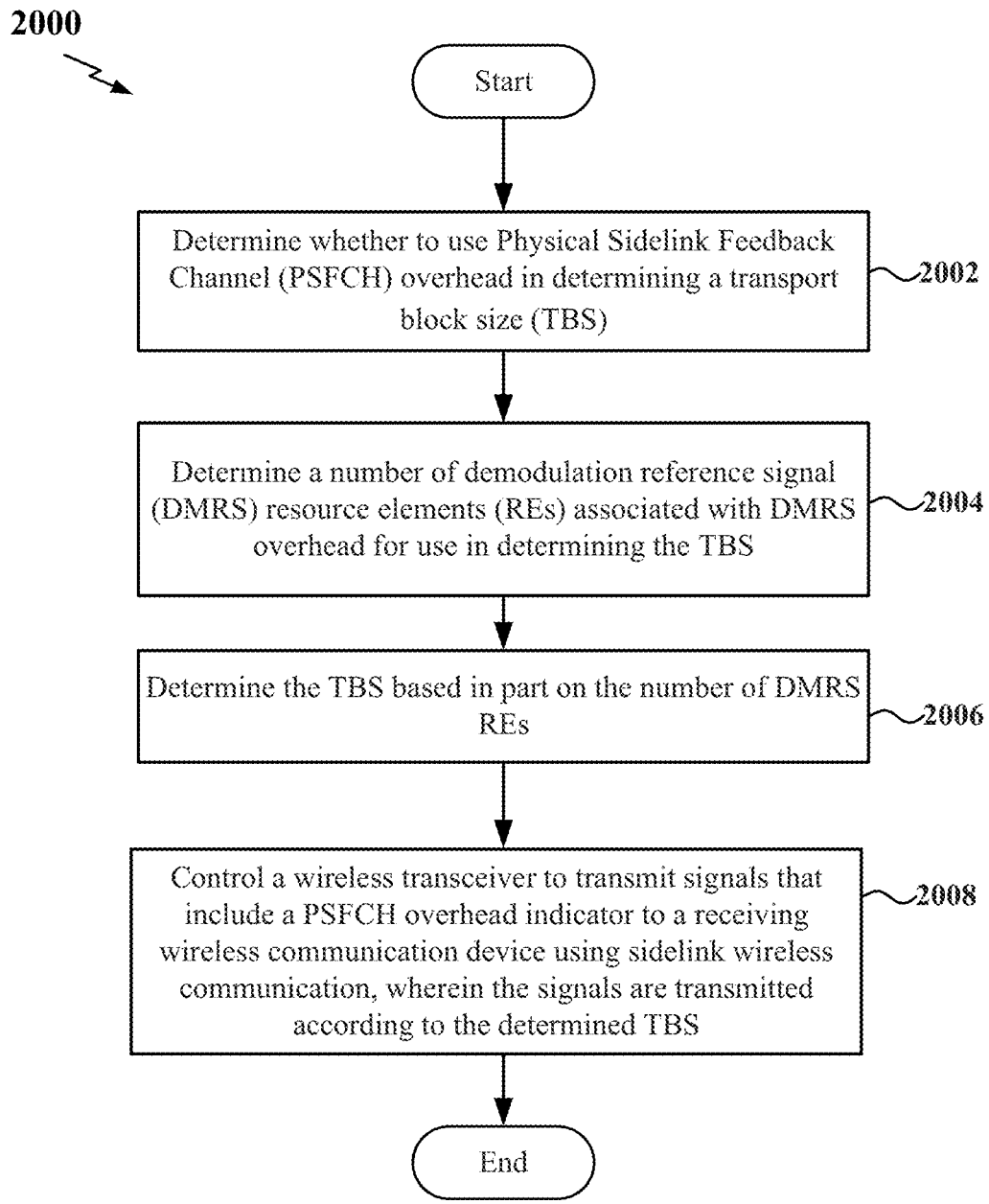
FIG. 20 is a flow chart of an exemplary method for sidelink communication for use by a transmitting wireless communication device, wherein a number of DMRS resource elements (REs) associated with DMRS overhead is determined for use in determining the TBS and a PSFCH overhead indicator is generated and sent by a transmitting wireless communication device.

FIG. 20 is a flowchart 2000 summarizing aspects of an exemplary method for sidelink communication that may be performed by a transmitting wireless communication device (such as wireless device 1700 of FIG. 17). At 2002, the wireless communication device determines whether to use PSFCH overhead in determining TBS for sidelink communications. At 2004, the wireless communication device determines a number of DMRS REs associated with DMRS overhead for use in determining the TBS. As explained above, a table may be consulted that lists the average number of DMRS REs to be used in determining the TBS, where the table lists the particular average number to be used with various different configurations (as represented, for example, by the number of DMRS symbols in the configuration pattern). In some examples, different values for the average number may be specified depending based on whether or PSFCH overhead is to be used in determining the TBS (as shown by way of the two "average number" columns TABLE I). In other examples, the same average number may be used regardless of whether PSFCH overhead is to be used in determining the TBS. For example, only a single "average number" column may be used (such as the middle column of TABLE I).

At 2006, the wireless communication device determines the TBS based in part on the number of DMRS REs. At 2008, the wireless communication device controls a wireless transceiver to transmit signals that include a PSFCH overhead indicator to a receiving wireless communication device using sidelink wireless communication, wherein the signals are transmitted according to the determined TBS. As explained above, the PSFCH overhead indicator may be set to inform the receiving wireless communication device whether or not PSFCH resources are to be used when determining TBS. See, above, for detailed examples.

Figure 21:
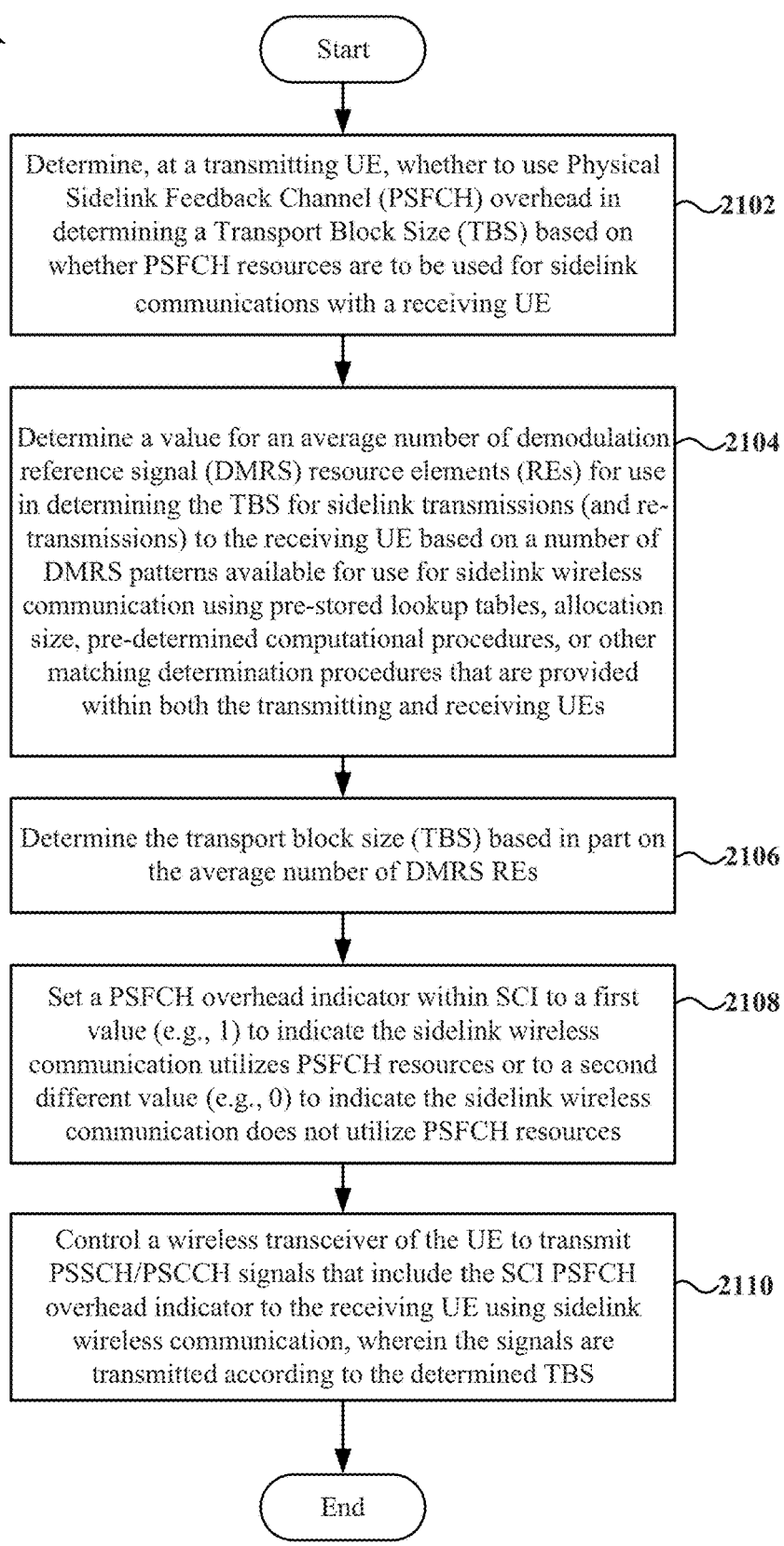
FIG. 21 is a flow chart further illustrating an exemplary method for sidelink communication for use by a transmitting wireless communication device, wherein a number of DMRS REs associated with DMRS overhead is determined for use in determining the TBS and a PSFCH overhead indicator is generated and sent by a transmitting wireless communication device.

FIG. 21 is a flowchart 2100 further summarizing aspects of an exemplary method for sidelink communication that may be performed by a transmitting UE or other wireless communication device (such as UE 1700 of FIG. 17). At 2102, the transmitting UE determines whether to use PSFCH overhead in determining the TBS to be used for sidelink communications with a receiving UE (such as UE 1800 of FIG. 18), where the determination may be based, for example, on whether PSFCH resources are to be used during sidelink communications. At 2104, the UE determines a value for an average number of DMRS REs for determining the TBS for a transmissions (and re-transmissions) to the receiving UE based on the number of DMRS patterns available for use for sidelink wireless communication using pre-stored lookup tables, allocation size, pre-determined computational procedures, or other matching determination procedures that are provided within both the transmitting and receiving UEs. See, above, for detailed examples.

At 2106, the UE determines the TBS based in part on the average number of DMRS REs. At 2108, the UE sets a PSFCH overhead indicator within SCI (e.g., SCI-1) to a first value (e.g., 1) to indicate the sidelink wireless communication utilizes PSFCH resources or to a second different value (e.g., 0) to indicate the sidelink wireless communication does not utilize PSFCH resources. At 2110, the UE controls a wireless transceiver of the UE to transmit PSSCH/PSCCH signals that include the SCI PSFCH overhead indicator to the receiving UE using sidelink wireless communication, wherein the signals are transmitted according to the determined TBS.

Figure 22:
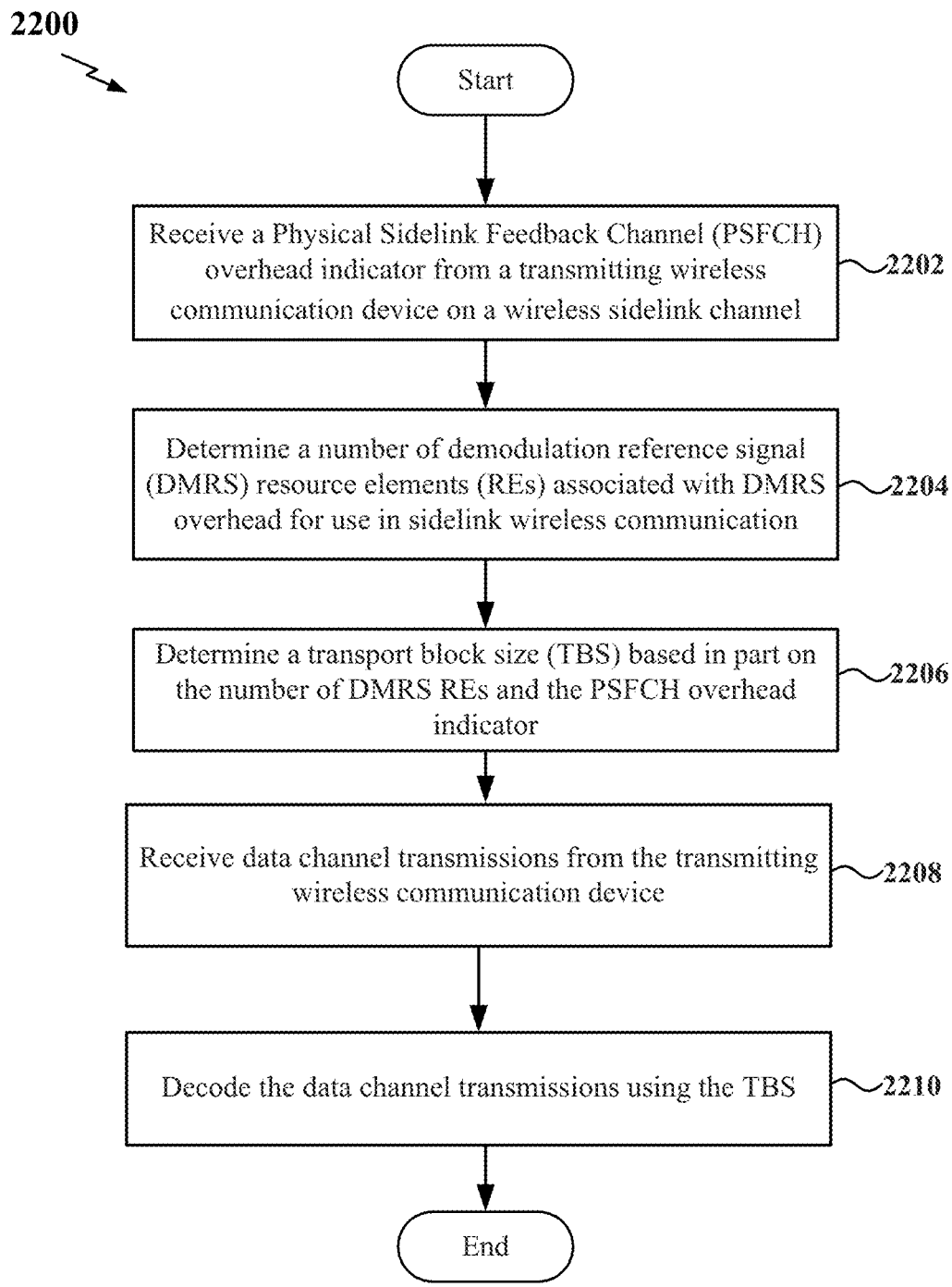
FIG. 22 is a flow chart of an exemplary method for sidelink communication for use by a receiving wireless communication device, wherein a PSFCH overhead indicator is received and a number of DMRS REs associated with DMRS overhead is determined based on the indicator for use in determining the TBS.

FIG. 22 is a flowchart 2200 summarizing aspects of an exemplary method for sidelink communication that may be performed by a receiving wireless communication device (such as wireless device 1800 of FIG. 18). At 2202, the wireless communication device receives a PSFCH overhead indicator from a transmitting wireless communication device (such as wireless device 1700 of FIG. 187 on a wireless sidelink channel. At 2204, the wireless communication device determines a number of DMRS REs associated with DMRS overhead for use in sidelink wireless communications. As already explained, the determination may be based, in some examples, on whether PSFCH resources are to be used during sidelink communications and, in other examples, the determination is made without regard to whether PSFCH resources are to be used. At 2206, the wireless communication device determines the TBS based in part on the number of DMRS REs and the PSFCH overhead indicator. In this regard, if the PSFCH overhead indicator is set to indicate that PSFCH overhead is being used, then the resulting TBS determined at 2206 may differ from the TBS determinized if PSFCH overhead is not being used. This difference may arise even if the number of DMRS REs determined at 2202 does not explicitly depend on whether the PSFCH overhead indicator is set on (1) or off (0). At 2208, the wireless communication device receives data channel transmissions from the transmitting wireless communication device. At 2210, the wireless communication device decodes the data channel transmissions using the TBS.

Figure 23:
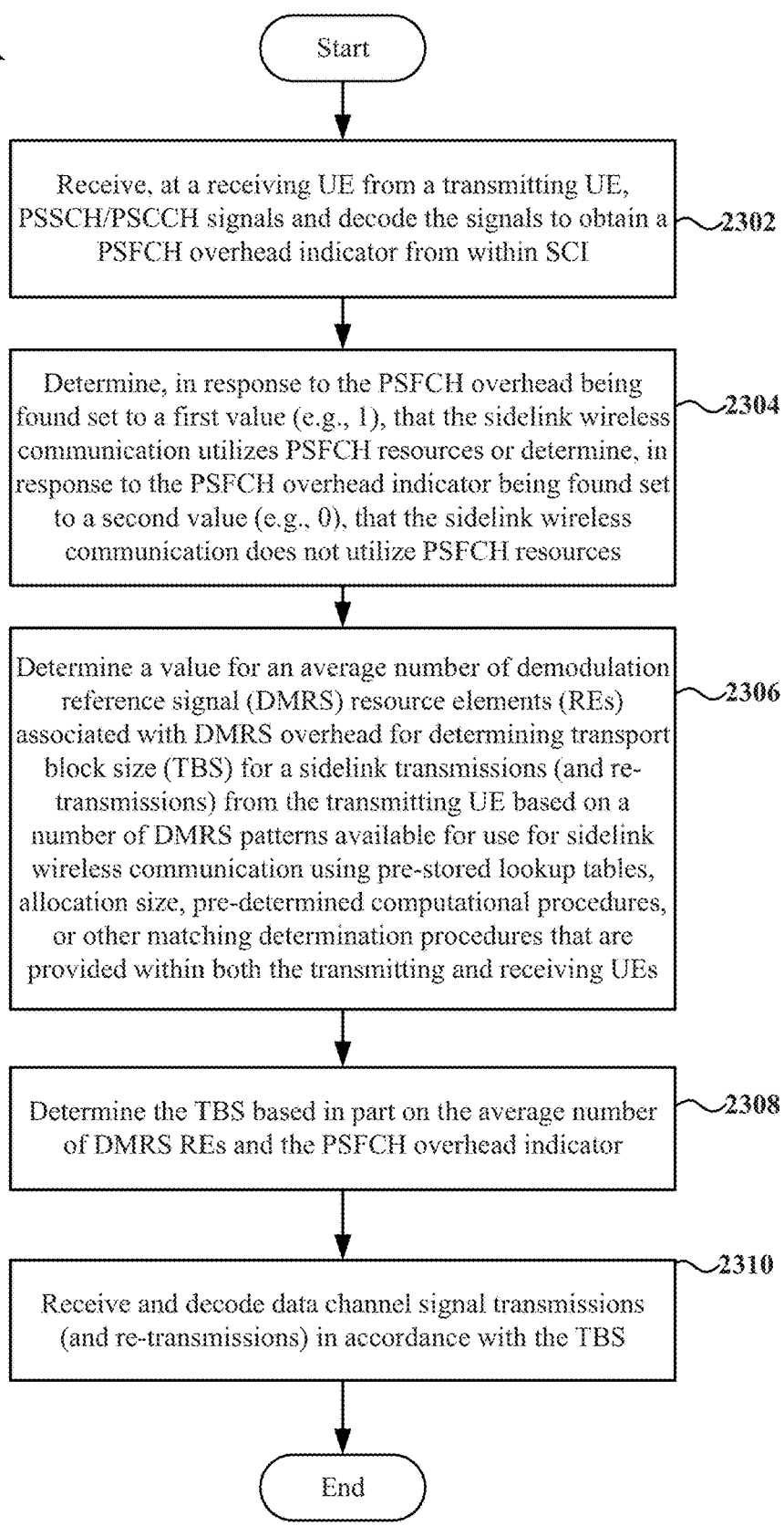
FIG. 23 is a flow chart further illustrating an exemplary method for sidelink communication for use by a receiving wireless communication device, wherein a PSFCH overhead indicator is received and a number of DMRS REs associated with DMRS overhead is determined based on the indicator for use in determining the TBS.

FIG. 23 is a flowchart 2300 further summarizing aspects of an exemplary method for sidelink communication aspects that may be performed by a receiving UE or other wireless communication device (such as UE 1800 of FIG. 18). At 2302, the UE receives, from a transmitting UE, PSSCH/PSCCH signals and decodes the signals to obtain a PSFCH overhead indicator from within SCI. At 2304, the UE determines, in response to the PSFCH overhead being found set to a first value (e.g., 1), that the sidelink wireless communication utilizes PSFCH resources or determine, in response to the PSFCH overhead indicator being found set to a second value (e.g., 0), that the sidelink wireless communication does not utilize PSFCH resources. At 2306, the UE determines a value for an average number of DMRS REs associated with DMRS overhead for determining the TBS for a sidelink transmissions (and re-transmissions) from the transmitting UE based on a number of DMRS patterns available for use for sidelink wireless communication using pre-stored lookup tables, allocation size, pre-determined computational procedures, or other matching determination procedures that are provided within both the transmitting and receiving UEs. See, above, for detailed examples. As already explained, in some examples, the average number of DMRS REs to be used for TBS determination may depend on whether the PSFCH overhead indicator is set on (1) or off (0). In other examples, the average number of DMRS REs to be used for TBS determination may be the same regardless of the setting of the PSFCH overhead indicator. (The number of DMRS REs used for other purposes may differ from the values used for determining the TBS.) At 2308, the UE determines the TBS based in part on the average number of DMRS REs and the PSFCH overhead indicator. At 2310, the UE receives and decodes data channel signal transmissions (and re-transmissions) in accordance with the TBS.

Figure 24:
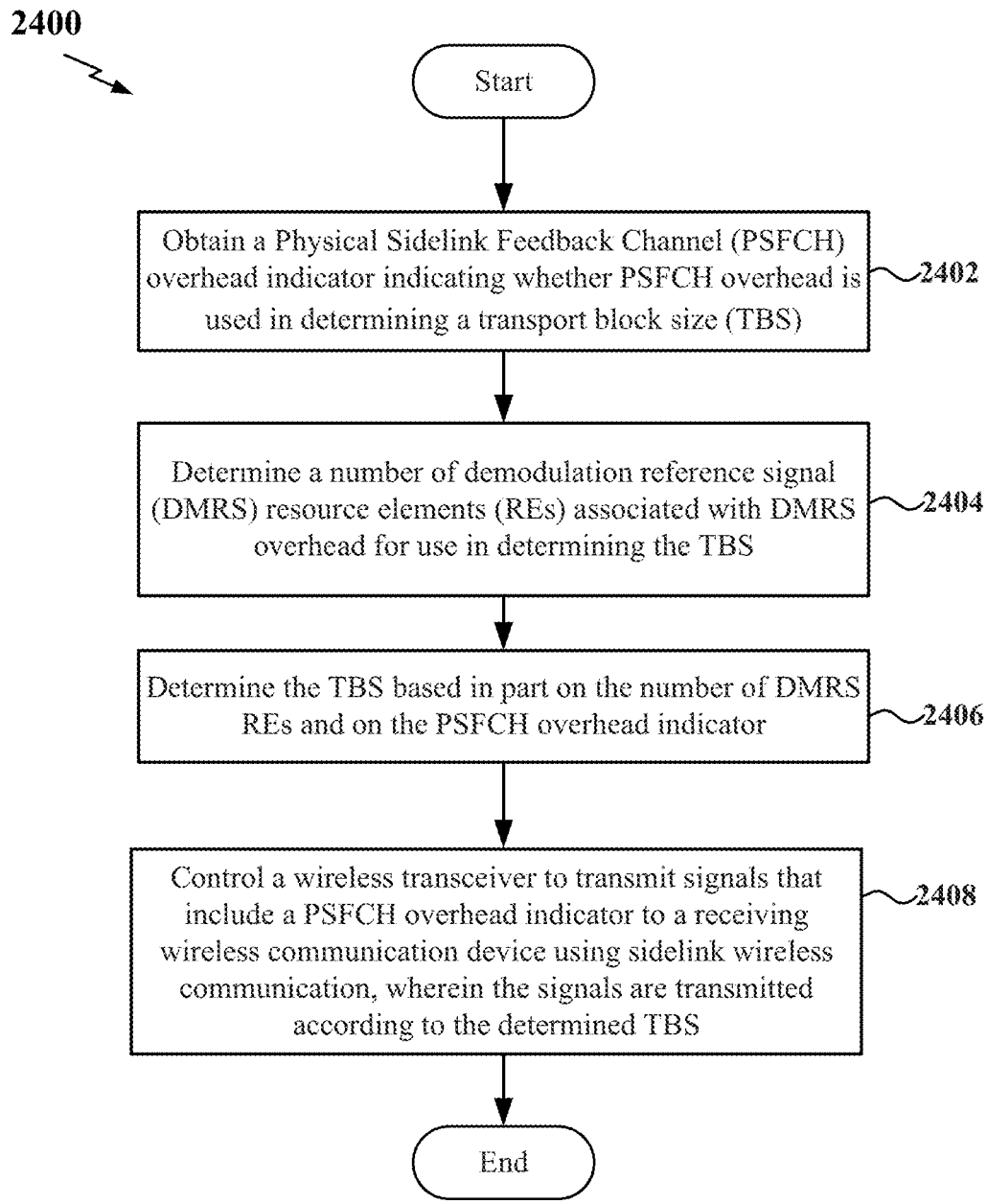
FIG. 24 is a flow chart of an exemplary method for sidelink communication for use by a transmitting wireless communication device, wherein the transmitting wireless communication device generates or otherwise obtains a PSFCH overhead indicator indicating whether PSFCH overhead is used in determining a TBS and the PSFCH overhead indicator is sent to a receiving wireless communication device.

FIG. 24 is a flowchart 2400 summarizing aspects of an exemplary method for sidelink communication that may be performed by a transmitting wireless communication device (such as wireless device 1700 of FIG. 17). At 2402, the wireless communication device generates or otherwise obtains a PSFCH overhead indicator indicating whether PSFCH overhead is used in determining a TBS. At 2404, the wireless communication device determines a number of DMRS REs associated with DMRS overhead for use in determining the TBS. As explained above, a table may be consulted that lists the average number of DMRS REs to be used in determining the TBS, where the table lists the particular average number to be used with various different configurations (as represented, for example, by the number of DMRS symbols in the configuration pattern). In some examples, different values for the average number may be specified depending based on whether or PSFCH overhead is to be used in determining the TBS (as shown by way of the two "average number" columns TABLE I). In other examples, the same average number may be used regardless of whether PSFCH overhead is to be used in determining the TBS. For example, only a single "average number" column may be used (such as the middle column of TABLE I). At 2406, the wireless communication device determines the TBS based in part on the number of DMRS REs and on the PSFCH overhead indicator. At 2408, the wireless communication device controls a wireless transceiver to transmit signals that include a PSFCH overhead indicator to a receiving wireless communication device using sidelink wireless communication, wherein the signals are transmitted according to the determined TBS. The PSFCH overhead indicator may be set to inform the receiving wireless communication device whether or not PSFCH overhead is to be used when determining TBS. See, above, for detailed examples.

The following provides an overview of examples of the present disclosure.

Example 1: wireless communication device for use in a sidelink wireless communication network comprises: a wireless transceiver; a memory; and a processor communicatively coupled to the wireless transceiver and the memory. The processor is configured to: generate a PSFCH overhead indicator indicating whether PSFCH overhead is used in determining a TBS; determine a number of DMRS REs associated with DMRS overhead for use in determining the TBS; determine the TBS based in part on the number of DMRS REs and the PSFCH overhead indicator; and control the wireless transceiver to transmit signals that include the PSFCH overhead indicator to a receiving wireless communication device using sidelink wireless communication, wherein the signals are transmitted according to the determined TBS.

Example 2: the wireless communication device of example 1, wherein the processor is further configured to generate the PSFCH overhead indicator.

Example 3: the wireless communication device of examples 1 or 2, wherein the processor is further configured to generate the PSFCH overhead indicator based, in part, on information received from a base station.

Example 4: the wireless communication device of example 1, 2, or 3, wherein the processor is further configured to set the PSFCH overhead indicator as a single bit.

Example 5: the wireless communication device of examples 1, 2, 3, or 4, wherein the processor is further configured to determine an average number of DMRS REs for use as the number of DMRS REs associated with DMRS overhead based on a number of DMRS patterns available for the sidelink wireless communication.

Example 6: the wireless communication device of examples 1, 2, 3, 4, or 5, wherein the processor is further configured to determine the average number of DMRS REs from a table.

Example 7: the wireless communication device of examples 1, 2, 3, 4, 5, or 6, wherein the processor is further configured to determine the number of DMRS REs based on whether the PSFCH overhead is used.

Example 8: the wireless communication device of examples 1, 2, 3, 4, 5, 6, or 7, wherein the processor is further configured to control the wireless transceiver to transmit the PSFCH overhead indicator within sidelink control information SCI.

Example 9: the wireless communication device of examples 1, 2, 3, 4, 5, 6, 7, or 8, wherein the processor is further configured to apply the determined number of DMRS REs to both transmissions and re-transmissions to the receiving wireless communication device so that the TBS is the same for both the transmissions and the re-transmissions.

Example 10: a method of sidelink wireless communication at a wireless communication device comprises: generating a PSFCH overhead indicator indicating whether PSFCH overhead is used in determining a TBS; determining a number of DMRS REs associated with DMRS overhead for use in determining the TBS; determining the TBS based in part on the number of DMRS REs and the PSFCH overhead indicator; and controlling a wireless transceiver to transmit signals that include the PSFCH overhead indicator to a receiving wireless communication device using sidelink wireless communication, wherein the signals are transmitted according to the determined TBS.

Example 11: the method of example 10, further comprising generating the PSFCH overhead indicator.

Example 12: the method of examples 10 or 11, wherein the PSFCH overhead indicator is generated based, in part, on information received from a base station.

Example 13: the method of examples 10, 11, or 12, further comprising setting the PSFCH overhead indicator as a single bit.

Example 14: the method of examples 10, 11, 12 or 13, further comprising determining an average number of DMRS REs for use as the number of DMRS REs associated with DMRS overhead based on a number of DMRS patterns available for sidelink wireless communication.

Example 15: the method of examples 10, 11, 12, 13, or 14, further comprising determining the average number of DMRS REs from a table.

Example 16: the method of examples 10, 11, 12, 13, 14, or 15, further comprising determining the number of DMRS REs based on whether the PSFCH overhead is used.

Example 17: the method of examples 10, 11, 12, 13, 14, 15, or 16, wherein the PSFCH overhead indicator is transmitted within SCI.

Example 18: the method of examples 10, 11, 12, 13, 14, 15, 16, or 17, further comprising applying the determined number of DMRS REs to both transmissions and re-transmissions to the receiving wireless communication device so that the TBS is the same for both the transmissions and the re-transmissions.

Example 19: wireless communication device for use in a sidelink wireless communication network comprises: a wireless transceiver; a memory; and a processor communicatively coupled to the wireless transceiver and the memory. The processor is configured to: receive a PSFCH overhead indicator from a transmitting wireless communication device using the wireless transceiver on a wireless sidelink channel; determine a number of DMRS REs associated with DMRS overhead for use in sidelink wireless communication; determine a TBS based in part on the number of DMRS REs and the PSFCH overhead indicator; receive data channel transmissions from the transmitting wireless communication device; and decode the data channel transmissions using the TBS.

Example 20: the wireless communication device of example 19, wherein the processor is further configured to determine, in response to the PSFCH overhead indicator set to a first value, that the sidelink wireless communication utilizes the PSFCH resources for determining the TBS, and to determine, in response to the PSFCH overhead indicator set to a second value, that the sidelink wireless communication does not utilize the PSFCH resources for determining the TBS.

Example 21: the wireless communication device of examples 19 or 20, wherein the processor is further configured to determine an average number of DMRS REs for use as the number of DMRS REs for determining the TBS.

Example 22: the wireless communication device of examples 19, 20, or 21, wherein the processor is further configured to determine the number of DMRS REs based on whether PSFCH overhead is used.

Example 23: the wireless communication device of examples 19, 20, 21, or 22, wherein the processor is further configured to decode the PSFCH overhead indicator from within sidelink control information (SCI) received from the transmitting wireless communication device.

Example 24: a method of sidelink wireless communication at a wireless communication device comprises: receiving a PSFCH overhead indicator from a transmitting wireless communication device on a wireless sidelink channel; determining a number of DMRS REs associated with DMRS overhead for use in sidelink wireless communication; determining a TBS based in part on the number of DMRS REs and the PSFCH overhead indicator; receiving data channel transmissions from the transmitting wireless communication device; and decoding the data channel transmissions using the TBS.

Example 25: the method of example 24, further comprising determining, in response to the PSFCH overhead set to a first value, that the sidelink wireless communication utilizes PSFCH resources for determining the TBS, and determining, in response to the PSFCH overhead indicator set to a second value, that the sidelink wireless communication does not utilize the PSFCH resources for determining the TBS.

Example 26: the method of examples 24 or 25, further comprising determining an average number of DMRS REs for use as the number of DMRS REs for determining the TBS.

Example 27: the method of examples 24, 25, or 26, further comprising determining the average number of DMRS REs based on a number of DMRS patterns available for the sidelink wireless communication depending on whether the sidelink wireless communication utilizes PSFCH resources.

Example 28: the method of examples 24, 25, 26, or 27, further comprising determining the average number of DMRS REs from a table Example 29: the method of examples 24, 25, 26, 27, or 28, further comprising determining the number of DMRS REs based on whether PSFCH overhead is used.

Example 30: the method of examples 24, 25, 26, 27, 28, or 29, further comprising decoding the PSFCH overhead indicator from within SCI received from the transmitting wireless communication device.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, features and/or functions illustrated in FIGS. 1-23 may be rearranged and/or combined into a single component, feature or function or embodied in several components, or functions. Additional elements, components, and/or functions may also be added without departing from features disclosed herein. The apparatus, devices, and/or components illustrated in FIGS. 1-5 and/or 8-11 and/or 17-18 may be configured to perform one or more of the methods, features, or functions described herein. The algorithms described herein may also be efficiently implemented in software and/or embedded in hardware.

It is to be understood that the specific order or hierarchy of blocks in the methods disclosed is an illustration of exemplary processes. Based upon design preferences, it is understood that the specific order or hierarchy of blocks in the methods may be rearranged. The accompanying method claims present elements in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A wireless communication device for use in a sidelink wireless communication network, comprising:
   a wireless transceiver;
   a memory; and
   a processor communicatively coupled to the wireless transceiver and the memory, wherein the processor is configured to:

obtain a Physical Sidelink Feedback Channel (PSFCH) overhead indicator indicating whether PSFCH overhead is used in determining a transport block size (TBS);

determine a number of demodulation reference signal (DMRS) resource elements (REs) associated with DMRS overhead for use in determining the TBS by obtaining the number of DMRS REs from a table stored in the memory;

determine the TBS based in part on the number of DMRS REs and the PSFCH overhead indicator; and control the wireless transceiver to transmit signals that include the PSFCH overhead indicator to a receiving wireless communication device using sidelink wireless communication, wherein the signals are transmitted according to the determined TBS.

2. The wireless communication device of claim 1, wherein the processor is further configured to generate the PSFCH overhead indicator.

3. The wireless communication device of claim 2, wherein the processor is further configured to generate the PSFCH overhead indicator based, in part, on information received from a base station.

4. The wireless communication device of claim 1, wherein the processor is further configured to set the PSFCH overhead indicator as a single bit.

5. The wireless communication device of claim 1, wherein the processor is further configured to determine an average number of DMRS REs for use as the number of DMRS REs associated with DMRS overhead from the table based on a number of DMRS patterns available for the sidelink wireless communication.

6. The wireless communication device of claim 1, wherein the processor is further configured to control the wireless transceiver to transmit the PSFCH overhead indicator within sidelink control information (SCI).

7. The wireless communication device of claim 1, wherein the processor is further configured to apply the determined number of DMRS REs to both transmissions and re-transmissions to the receiving wireless communication device so that the TBS is the same for both the transmissions and the re-transmissions.

8. The wireless communication device of claim 1, wherein the table is configured to relate each of a plurality of configured DMRS patterns to a corresponding number of DMRS REs.

9. The wireless communication device of claim 8, wherein the plurality of configured DMRS patterns are represented by a number of DMRS symbols of the pattern.

10. A method of sidelink wireless communication at a wireless communication device, the method comprising:

obtaining a Physical Sidelink Feedback Channel (PSFCH) overhead indicator indicating whether PSFCH overhead is used in determining a transport block size (TBS);

determining a number of demodulation reference signal (DMRS) resource elements (REs) associated with DMRS overhead for use in determining the TBS by obtaining the number of DMRS REs from a table stored in the memory;

determining the TBS based in part on the number of DMRS REs and the PSFCH overhead indicator; and controlling a wireless transceiver to transmit signals that include the PSFCH overhead indicator to a receiving wireless communication device using sidelink wireless communication, wherein the signals are transmitted according to the determined TBS.

11. The method of claim 10, further comprising generating the PSFCH overhead indicator.

12. The method of claim 11, wherein the PSFCH overhead indicator is generated based, in part, on information received from a base station.

13. The method of claim 10, further comprising setting the PSFCH overhead indicator as a single bit.

14. The method of claim 10, further comprising determining an average number of DMRS REs for use as the number of DMRS REs associated with DMRS overhead based on a number of DMRS patterns available for the sidelink wireless communication.

15. The method of claim 10, wherein the PSFCH overhead indicator is transmitted within sidelink control information (SCI).

16. The method of claim 10, further comprising applying the determined number of DMRS REs to both transmissions and re-transmissions to the receiving wireless communication device so that the TBS is the same for both the transmissions and the re-transmissions.

17. The method of claim 10, wherein the table is configured to relate each of a plurality of configured DMRS patterns to a corresponding number of DMRS REs.

18. The method of claim 17, wherein the plurality of configured DMRS patterns are represented by a number of DMRS symbols of the pattern.

19. A wireless communication device for use in a sidelink wireless communication network, comprising:

a wireless transceiver;

a memory; and a processor communicatively coupled to the wireless transceiver and the memory, wherein the processor is configured to:

receive a Physical Sidelink Feedback Channel (PSFCH) overhead indicator from a transmitting wireless communication device using the wireless transceiver on a wireless sidelink channel, with the PSFCH overhead indicator configured to indicate whether PSFCH overhead is used in determining a transport block size (TBS);

determine a number of demodulation reference signal (DMRS) resource elements (REs) associated with DMRS overhead for use in sidelink wireless communication by obtaining the number of DMRS REs from a table stored in the memory;

determine the TBS based in part on the number of DMRS REs and the PSFCH overhead indicator;

receive data channel transmissions from the transmitting wireless communication device; and decode the data channel transmissions using the TBS.

20. The wireless communication device of claim 19, wherein the processor is further configured to determine, in response to the PSFCH overhead indicator set to a first value, that the sidelink wireless communication utilizes PSFCH resources for determining the TBS, and to determine, in response to the PSFCH overhead indicator set to a second value, that the sidelink wireless communication does not utilize the PSFCH resources for determining the TBS.

21. The wireless communication device of claim 19, wherein the processor is further configured to determine an average number of DMRS REs from the table for use as the number of DMRS REs for determining the TBS.

22. The wireless communication device of claim 19, wherein the processor is further configured to decode the PSFCH overhead indicator from within sidelink control information (SCI) received from the transmitting wireless communication device.

23. The wireless communication device of claim 19, wherein the table is configured to relate each of a plurality of configured DMRS patterns to a corresponding number of DMRS REs.

24. The wireless communication device of claim 23, wherein the plurality of configured DMRS patterns are represented by a number of DMRS symbols of the pattern.

25. A method of sidelink wireless communication at a wireless communication device, the method comprising:
- receiving a Physical Sidelink Feedback Channel (PSFCH) overhead indicator from a transmitting wireless communication device on a wireless sidelink channel, with the PSFCH overhead indicator configured to indicate whether PSFCH overhead is used in determining a transport block size (TBS);
- determining a number of demodulation reference signal (DMRS) resource elements (REs) associated with DMRS overhead for use in sidelink wireless communication by obtaining the number of DMRS REs from a table stored in the memory;
- determining the TBS based in part on the number of DMRS REs and the PSFCH overhead indicator;
- receiving data channel transmissions from the transmitting wireless communication device; and
- decoding the data channel transmissions using the TBS.

26. The method of claim 25, further comprising determining, in response to the PSFCH overhead indicator set to a first value, that the sidelink wireless communication utilizes PSFCH resources for determining the TBS, and determining, in response to the PSFCH overhead indicator set to a second value, that the sidelink wireless communication does not utilize the PSFCH resources for determining the TBS.

27. The method of claim 25, further comprising determining an average number of DMRS REs from the table for use as the number of DMRS REs for determining the TBS.

28. The method of claim 27, further comprising determining the average number of DMRS REs based on a number of DMRS patterns available for the sidelink wireless communication depending on whether the sidelink wireless communication utilizes PSFCH resources.

29. The method of claim 25, wherein the table is configured to relate each of a plurality of configured DMRS patterns to a corresponding number of DMRS REs.

30. The method of claim 29, wherein the plurality of configured DMRS patterns are represented by a number of DMRS symbols of the pattern.

\* \* \* \* \*